(12) United States Patent
Sarioglu et al.

(10) Patent No.: US 11,392,831 B2
(45) Date of Patent: Jul. 19, 2022

(54) SYSTEMS AND METHODS FOR DECODING CODE-MULTIPLEXED COULTER SIGNALS USING MACHINE LEARNING

(71) Applicant: GEORGIA TECH RESEARCH CORPORATION, Atlanta, GA (US)

(72) Inventors: Ali Fatih Sarioglu, Atlanta, GA (US); Ningquan Wang, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 0 days.

(21) Appl. No.: 17/285,561

(22) PCT Filed: Oct. 17, 2019

(86) PCT No.: PCT/US2019/056735
§ 371 (c)(1),
(2) Date: Apr. 15, 2021

(87) PCT Pub. No.: WO2020/081812
PCT Pub. Date: Apr. 23, 2020

(65) Prior Publication Data
US 2021/0397952 A1     Dec. 23, 2021

Related U.S. Application Data

(60) Provisional application No. 62/746,578, filed on Oct. 17, 2018.

(51) Int. Cl.
*G06N 3/08* (2006.01)
*G06K 9/62* (2022.01)
(Continued)

(52) U.S. Cl.
CPC ........... *G06N 3/08* (2013.01); *G01N 15/1056* (2013.01); *G01N 15/12* (2013.01); *G06K 9/6257* (2013.01);
(Continued)

(58) Field of Classification Search
CPC .. G06K 9/6257; G01N 15/02; G01N 15/1209; G01N 15/1404; G01N 12/1227;
(Continued)

(56) References Cited

U.S. PATENT DOCUMENTS 6,850,314 B2 * 2/2005 Le ..................... G01N 21/4795
356/5.11
2004/0059992 A1 3/2004 Tan
(Continued)

FOREIGN PATENT DOCUMENTS

FR           2733596 A1   10/1996
WO       2012/083371       6/2012
(Continued)

OTHER PUBLICATIONS

Adamo, Andrea, et al. "Microfluidics-based assessment of cell deformability." Analytical chemistry 84.15 (2012): 6438-6443.
(Continued)

*Primary Examiner* — Hoa Q Pham
(74) *Attorney, Agent, or Firm* — Meunier Carlin & Curfman LLC

(57) ABSTRACT

Systems and methods for decoding code-multiplexed Coulter signals are described herein. An example method can include receiving a code-multiplexed signal detected by a network of Coulter sensors, where the code-multiplexed signal includes a plurality of distinct Coulter signals, and inputting the code-multiplexed signal into a deep-learning network. The method can also include determining information indicative of at least one of a size, a speed, or a location of a particle detected by the network of Coulter sensors by using the deep-learning network to process the code-multiplexed signal. The method can further include
(Continued)

storing the information indicative of at least one of the size, the speed, or the location of the particle detected by the network of Coulter sensors.

26 Claims, 34 Drawing Sheets

(51) Int. Cl.
  *G06N 3/04* (2006.01)
  *G01N 15/10* (2006.01)
  *G01N 15/12* (2006.01)
(52) U.S. Cl.
  CPC ......... *G06N 3/0472* (2013.01); *G06N 3/0481* (2013.01)
(58) Field of Classification Search
  CPC ..... G01N 33/48721; G01N 2015/1006; G01N 2015/1081; G01N 2015/149; G06N 3/02; G06N 3/08; G06N 3/0472; G06N 3/0481; B01L 2200/0652
  USPC .......................................... 356/335–343, 73
  See application file for complete search history.

(56) References Cited

U.S. PATENT DOCUMENTS

| | | | |
|---|---|---|---|
| 2014/0008307 | A1 | 1/2014 | Guldiken et al. |
| 2016/0139024 | A1 | 5/2016 | Kim |
| 2017/0023560 | A1 | 1/2017 | Ayliffe |
| 2017/0128941 | A1 | 5/2017 | Sadri et al. |
| 2019/0177677 | A1 | 6/2019 | Jonas et al. |
| 2019/0204204 | A1 | 7/2019 | Sarioglu |
| 2021/0404937 | A1* | 12/2021 | Sarioglu ............ G01N 15/1404 |

FOREIGN PATENT DOCUMENTS

| | | |
|---|---|---|
| WO | 2017/053592 A1 | 3/2017 |
| WO | 2017/070602 | 4/2017 |

OTHER PUBLICATIONS

Arimi, Milton M. "Particle size distribution as an emerging tool for the analysis of wastewater." Environmental Technology Reviews 7.1 (2018): 274-290.
Asmare, N., et al., Proceedings of uTAS (The 22$^{nd}$ International Conference on Miniaturized Systems for Chemistry and Life Sciences), Kaohsiung, Taiwan, Nov. 11-15, 2018, pp. 1308-1310.
Bayley, Hagan, and Charles R. Martin. "Resistive-pulse sensing from microbes to molecules." Chemical reviews 100.7 (2000): 2575-2594.
Bezrukov, Sergey M., Igor Vodyanoy, and V. Adrian Parsegian. "Counting polymers moving through a single ion channel." Nature 370.6487 (1994): 279-281.
Branton, Daniel, et al. "The potential and challenges of nanopore sequencing." Nanoscience and technology: A collection of reviews from Nature Journals (2010): 261-268.
Bull, B. S., M. A. Schneiderman, and George Brecher. "Platelet counts with the Coulter counter." American journal of clinical pathology 44.6 (1965): 678-688.
Bult, Wouter, et al. "Intratumoral administration of holmium-166 acetylacetonate microspheres: antitumor efficacy and feasibility of multimodality imaging in renal cancer." PLoS One 8.1 (2013): e52178.
Bügel, Sebastian C., et al. "On-chip electroporation and impedance spectroscopy of single-cells." Sensors and Actuators B: Chemical 210 (2015): 82-90.
Chen, Min, et al. "Disease prediction by machine learning over big data from healthcare communities." Ieee Access 5 (2017): 8869-8879.
Civelekoglu, O, et al., Proceedings of 19th International Conference on Solid-State Sensors, Actuators and Microsystems (TRANSDUCERS), Kaohsiung, Taiwan, Jun. 18-22, 2017, pp. 480-483.
Civelekoglu, Ozgun, et al. "Electronic profiling of membrane antigen expression via immunomagnetic cell manipulation." Lab on a Chip 19.14 (2019): 2444-2455.
Coulter, W.H. High speed automatic blood cell counter and cell size analyzer. Proc Natl Electron Conf. 1956 (vol. 12). Chicago: National Electronics Conference, Inc.; 1956; pp. 1034-1040.
De Ninno, Adele, et al. "Coplanar electrode microfluidic chip enabling accurate sheathless impedance cytometry." Lab on a Chip 17.6 (2017): 1158-1166.
DeBlois, Ralph W., and C. P. Bean. "Counting and sizing of submicron particles by the resistive pulse technique." Review of Scientific Instruments 41.7 (1970): 909-916.
Duckworth, A. R., et al. "Retention efficiencies of the coral reef sponges Aplysina lacunosa, Callyspongia vaginalis and Niphates digitalis determined by Coulter counter and plate culture analysis." Marine Biology Research 2.4 (2006): 243-248.
Ginsburg, Erika, and Barbara K. Vonderhaar. "Prolactin synthesis and secretion by human breast cancer cells." Cancer Research 55.12 (1995): 2591-2595.
Gold, Robert. "Maximal recursive sequences with 3-valued recursive cross-correlation functions (Corresp.)." IEEE transactions on Information Theory 14.1 (1968): 154-156.
Gold, Robert. "Optimal binary sequences for spread spectrum multiplexing (Corresp.)." IEEE Transactions on information theory 13.4 (1967): 619-621.
Goodfellow, Ian, et al. Deep learning. vol. 1. No. 2. Cambridge: MIT press, 2016. Chapter 9, 329-366.
Grulke, D. C., N. A. Marsh, and B. A. Hills. "Experimental air embolism: measurement of microbubbles using the coulter counter." British journal of experimental pathology 54.6 (1973): 684-691.
Ignatov, Andrey. "Real-time human activity recognition from accelerometer data using Convolutional Neural Networks." Applied Soft Computing 62 (2018): 915-922.
Ito, Takashi, Li Sun, and Richard M. Crooks. "Simultaneous determination of the size and surface charge of individual nanoparticles using a carbon nanotube-based coulter counter." Analytical chemistry 75.10 (2003): 2399-2406.
Jagtiani, Ashish V. Novel multiplexed Coulter counters for high throughput parallel analysis of microparticles. Diss. University of Akron, 2011, 182 pages.
Jones, Donald R., Matthias Schonlau, and William J. Welch. "Efficient global optimization of expensive black-box functions." Journal of Global optimization 13.4 (1998): 455-492.
Kellman, Michael R., et al. "Node-pore coded coincidence correction: coulter counters, code design, and sparse deconvolution." IEEE sensors journal 18.8 (2018): 3068-3079.
Kiranyaz, Serkan, Turker Ince, and Moncef Gabbouj. "Real-time patient-specific ECG classification by 1-D convolutional neural networks." IEEE Transactions on Biomedical Engineering 63.3 (2015): 664-675.
Krizhevsky, Alex, et al. "ImageNet Classification with Deep Convolutional Neural Networks." Communications of the ACM, vol. 60, No. 6, 2017, pp. 84-90., doi:10.1145/3065386.
Kubitschek, Herbert E. "Electronic counting and sizing of bacteria." Nature 182.4630 (1958): 234-235.
Lambert, Scott, and Martin Wagner. "Formation of microscopic particles during the degradation of different polymers." Chemosphere 161 (2016): 510-517.
LeCun, Yann, Yoshua Bengio, and Geoffrey Hinton. "Deep learning." nature 521.7553 (2015): 436-444.
Lecun, Yann. "Deep Learning & Convolutional Networks." 2015 IEEE Hot Chips 27 Symposium (HCS), 2015, doi:10.1109/hotchips.2015.7477328. 95 pages.
Li, Wenhong, et al. "Single protein molecule detection by glass nanopores." ACS nano 7.5 (2013): 4129-4134.
Liu, Fan, Liwei Ni, and Jiang Zhe. "Lab-on-a-chip electrical multiplexing techniques for cellular and molecular biomarker detection." Biomicrofluidics 12.2 (2018): 021501.

(56) References Cited

OTHER PUBLICATIONS

Liu, R, et al., Proceedings of uTAS (The 22nd International Conference on Miniaturized Systems for Chemistry and Life Sciences), Kaohsiung, Taiwan, Nov. 11-15, 2018, pp. 1248-1250.
Liu, Ruxiu, et al. "Design and modeling of electrode networks for code division multiplexed resisitive pulse sensing in microfluidic devices." Lab on a Chip 17.15 (2017): 2650-2666.
Liu, Ruxiu, et al. "Scaling code-multiplexed electrode networks for distributed Coulter detection in microfluidics." Biosensors and Bioelectronics 120 (Nov. 2018): 30-39.
Liu, Ruxiu, et al. "Microfluidic CODES: A Scalable Multiplexed Electronic Sensor for Orthogonal Detection of Particles in Microfluidic Channels." Lab on a Chip, vol. 16, No. 8, 2016, pp. 1350-1357., doi:10.1039/c61c00209a.
Liu, Wei, et al. "Ssd: Single shot multibox detector." European conference on computer vision. Springer, Cham, 2016, 21-37.
Murugan, Pushparaja. "Implementation of deep convolutional neural network in multi-class categorical image classification." arXiv preprint arXiv:1801.01397 (2018).
Nyström, C., et al. "Dissolution rate measurements of sparingly soluble compounds with the Coulter Counter model TAII §." Journal of pharmacy and pharmacology 37.4 (1985): 217-221.
Poutrel, B., and C. Lerondelle. "Cell content of goat milk: California Mastitis Test, Coulter Counter, and Fossomatic for predicting half infection." Journal of Dairy Science 66.12 (1983): 2575-2579.
Rao R, et al., Basics of Code Division Multiple Access (CDMA), SPIE, Bellingham, WA, 2005. Chapter 3, 9 pages.
Roberts, George T., and Saad B. El Badawi. "Red blood cell distribution width index in some hematologic diseases." American journal of clinical pathology 83.2 (1985): 222-226.
Saleem, Ammar, et al. "Inhibition of cancer cell growth by crude extract and the phenolics of Terminalia chebula retz. fruit." Journal of Ethnopharmacology 81.3 (2002): 327-336.
Saleh, Omar A., and Lydia L. Sohn. "An artificial nanopore for molecular sensing." Nano letters 3.1 (2003): 37-38.
Shields IV, C. Wyatt, Catherine D. Reyes, and Gabriel P. López. "Microfluidic cell sorting: a review of the advances in the separation of cells from debulking to rare cell isolation." Lab on a Chip 15.5 (2015): 1230-1249.
Song, Hongjun, et al. "Identification of mesenchymal stem cell differentiation state using dual-micropore microfluidic impedance flow cytometry." Analytical Methods 8.41 (2016): 7437-7444.
Sun, Jiashu, et al. "Reference channel-based microfluidic resistance sensing for single yeast cell volume growth measurement." Microfluidics and Nanofluidics 21.3 (2017): 33.
Van Dyk, David A., and Xiao-Li Meng. "The art of data augmentation." Journal of Computational and Graphical Statistics 10.1 (2001): 1-50.
Wang, Jinghan, et al. "Comprehensive evaluation of the host responses to infection with differentially virulent classical swine fever virus strains in pigs." Virus research 255 (2018): 68-76.
Wang, N., et al., Proceedings of IEEE 30th International Conference on Micro Electro Mechanical Systems (MEMS), Las Vegas, USA, Jan. 22-26, 2017, pp. 362-365.
Wang, Ningquan, et al. "Decoding of Code-Multiplexed Coulter Sensor Signals via Deep Learning." 2019 20th International Conference on Solid-State Sensors, Actuators and Microsystems & Eurosensors XXXIII (Transducers & Eurosensors XXXIII). IEEE, 2019, 202-205.
Wang, Ningquan, et al. "Processing code-multiplexed Coulter signals via deep convolutional neural networks." Lab on a Chip 19.19 (2019): 3292-3304.
Wang, Ningquan, Ruxiu Liu, and A. Fatih Sarioglu. "Microfluidic platform with multiplexed electronic detection for spatial tracking of particles." Journal of visualized experiments: JoVE 121 (2017), e55311.
Winkler, Thomas E., Hadar Ben-Yoav, and Reza Ghodssi. "Hydrodynamic focusing for microfluidic impedance cytometry: a system integration study." Microfluidics and Nanofluidics 20.9 (2016):134, 1-14.
Zhang, Yu, William Chan, and Navdeep Jaitly. "Very deep convolutional networks for end-to-end speech recognition." 2017 IEEE International Conference on Acoustics, Speech and Signal Processing (ICASSP). IEEE, 2017, pp. 4845-4849.
Zhe, Jiang, et al. "A Micromachined High Throughput Coulter Counter for Bioparticle Detection and Counting." Journal of Micromechanics and Microengineering, vol. 17, No. 2, Nov. 2007, pp. 304-313., doi:10.1088/0960-1317/17/2/017.
Zhou, Ying, et al. "Characterizing deformability and electrical impedance of cancer cells in a microfluidic device." Analytical chemistry 90.1 (2018): 912-919.
Zou, Lili, et al. "A multistage-dialysis microdevice for extraction of cryoprotectants." Biomedical microdevices 19.2 (2017): 30.
International Search Report and Written Opinion dated Feb. 20, 2020, from International Application No. PCT/US2019/056735, 13 pages.
Extended European Search Report issued in corresponding EP 19873328.9, dated May 25, 2022 (7 pages).

\* cited by examiner

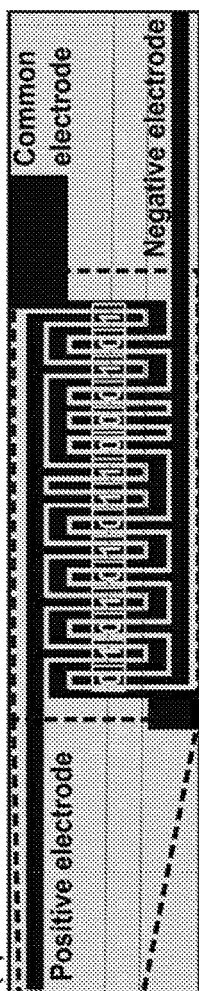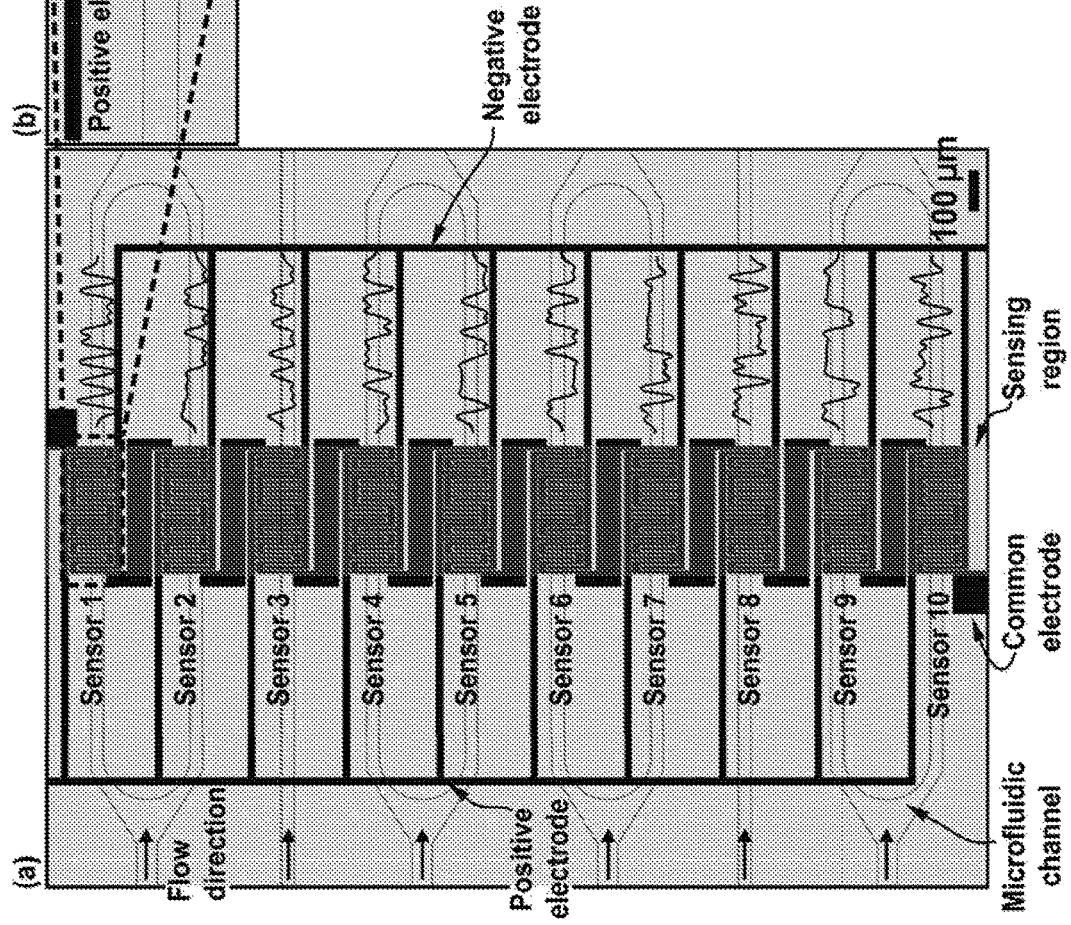
FIG. 7B
FIG. 7A

| | C-size | C-stride | C-pad | Act | P-size | P-stride | Params | O/P shape |
|---|---|---|---|---|---|---|---|---|
| Input | — | — | — | — | — | — | — | (200) |
| Conv-1 | (5) | 1 | 0 | — | — | — | 192 | (32, 196) |
| Activation-1 | — | — | — | ReLU | — | — | — | (32, 196) |
| Conv-2 | (5) | 1 | 0 | — | — | — | 5152 | (32, 192) |
| Activation-2 | — | — | — | ReLU | — | — | — | (32, 192) |
| Maxpooling-1 | — | — | — | — | (2) | 2 | — | (32, 96) |
| Conv-3 | (5) | 1 | 0 | — | — | — | 10304 | (64, 92) |
| Activation-3 | — | — | — | ReLU | — | — | — | (64, 92) |
| Conv-4 | (5) | 1 | 0 | — | — | — | 20544 | (64, 88) |
| Activation-4 | — | — | — | ReLU | — | — | — | (64, 88) |
| Maxpooling-2 | — | — | — | — | (2) | 2 | — | (64, 44) |
| Flatten | — | — | — | — | — | — | — | (2816) |
| Dense-1 | — | — | — | — | — | — | 180224 | (64) |
| Activation-5 | — | — | — | ReLU | — | — | — | (64) |
| Dense-2 | — | — | — | — | — | — | 640 | (—) |

FIG. 8

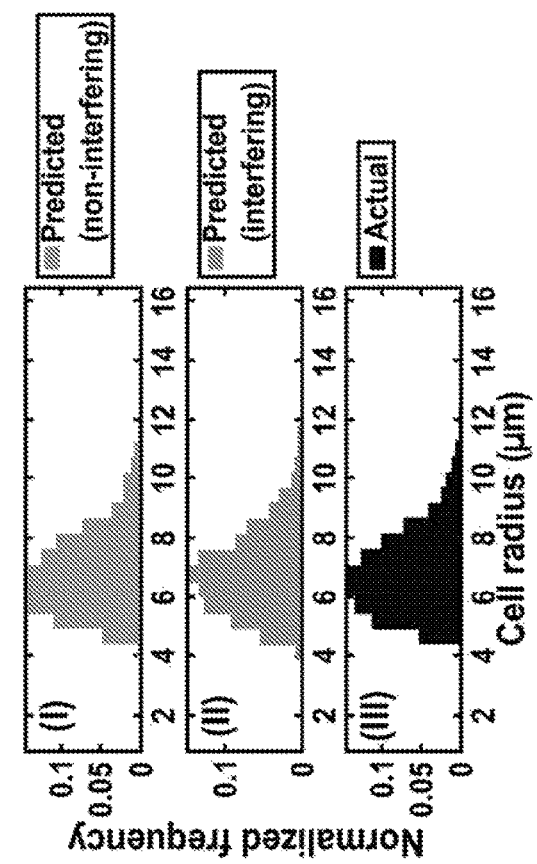
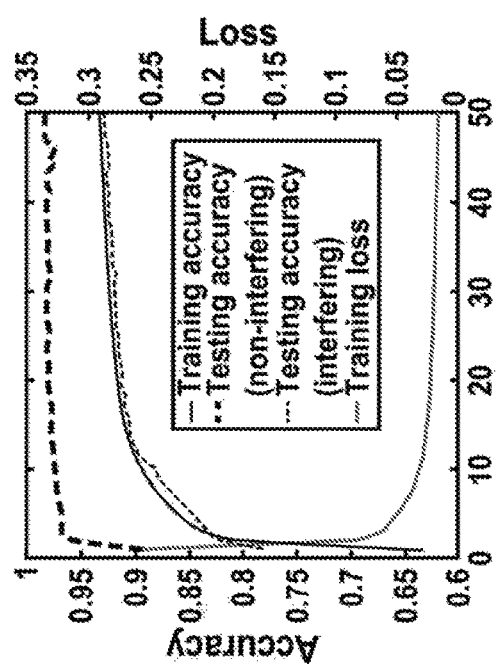
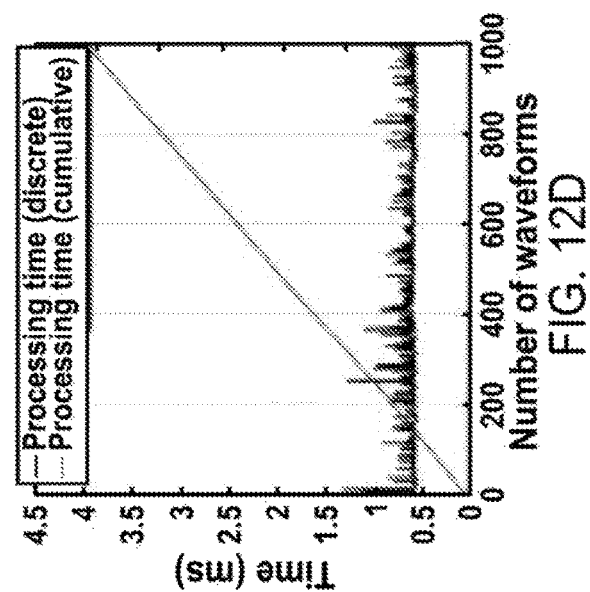
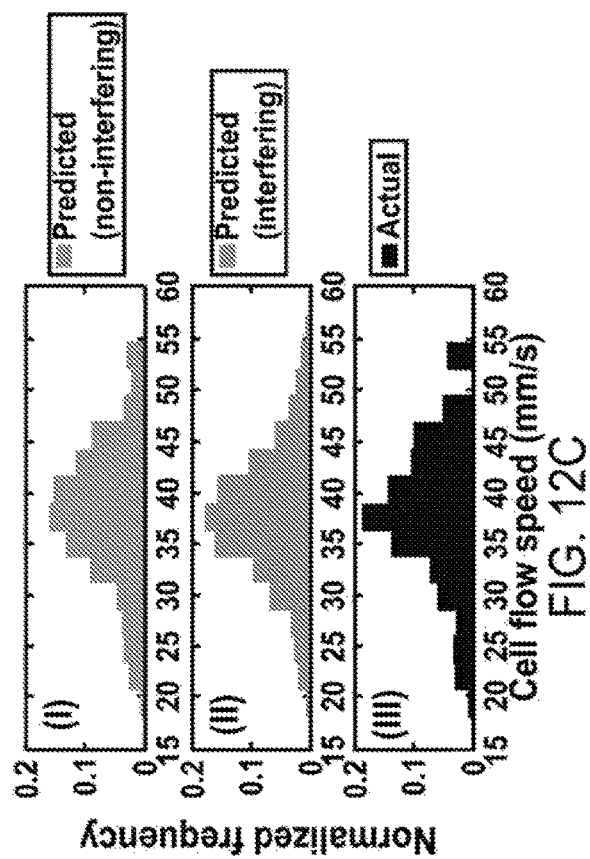
FIG. 12A
FIG. 12B
FIG. 12C
FIG. 12D

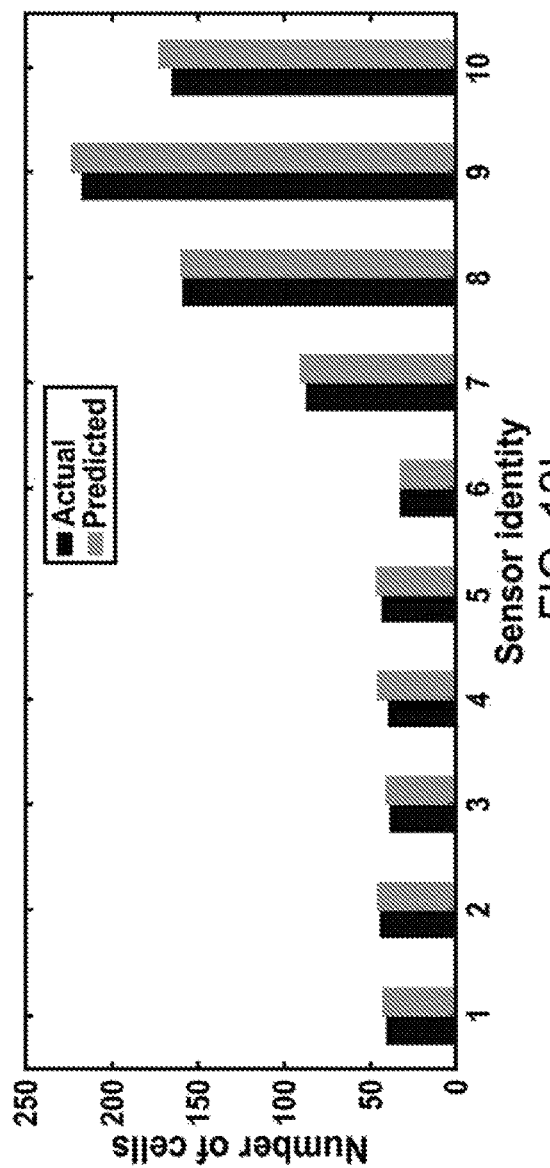
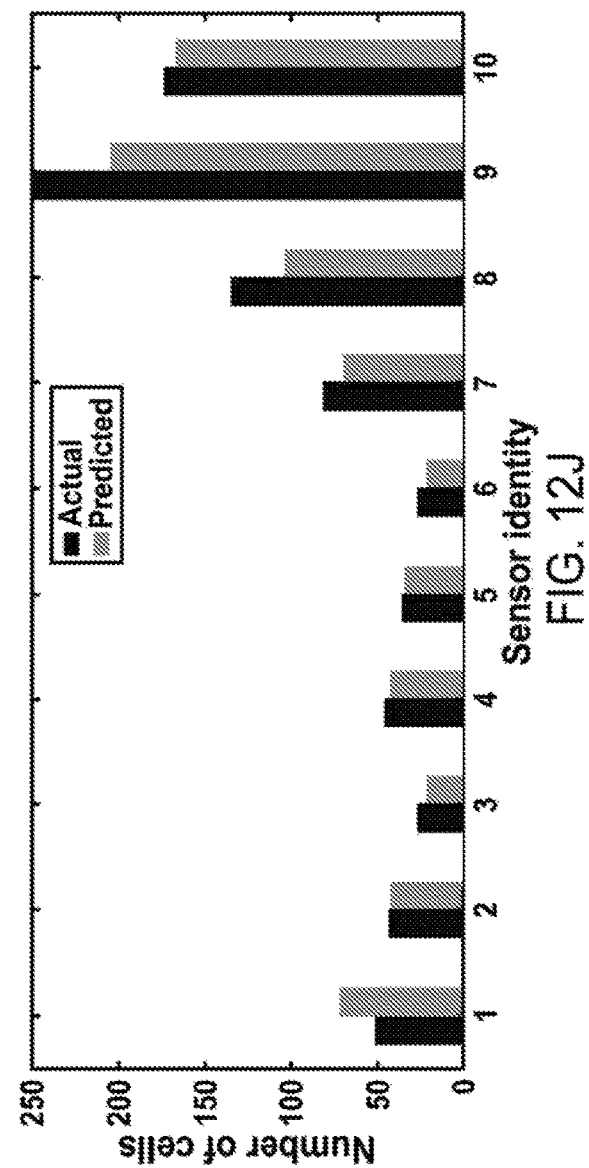
FIG. 12I
FIG. 12J

| | C-size | C-stride | C-pad | Act | P-size | P-pad | Params | O/P shape |
|---|---|---|---|---|---|---|---|---|
| Input | — | — | — | — | — | — | — | (200) |
| Conv-1 | (5) | 1 | 0 | — | — | — | 192 | (32, 196) |
| Activation-1 | — | — | — | ReLU | — | — | — | (32, 196) |
| Conv-2 | (5) | 1 | 0 | — | — | — | 5152 | (32, 192) |
| Activation-2 | — | — | — | ReLU | — | — | — | (32, 192) |
| Maxpooling-1 | — | — | — | — | (2) | 0 | — | (32, 96) |
| Conv-3 | (5) | 1 | 0 | — | — | — | 10304 | (64, 92) |
| Activation-3 | — | — | — | ReLU | — | — | — | (64, 92) |
| Conv-4 | (5) | 1 | 0 | — | — | — | 20544 | (64, 88) |
| Activation-4 | — | — | — | ReLU | — | — | — | (64, 88) |
| Maxpooling-2 | — | — | — | — | (2) | 0 | — | (64, 44) |
| Flatten | — | — | — | — | — | — | — | (2816) |
| Dense-1 | — | — | — | — | — | — | 180224 | (64) |
| Activation-5 | — | — | — | ReLU | — | — | — | (64) |
| Dense-2 | — | — | — | — | — | — | 640 | (10) |

FIG. 16

| Loss function | Optimizer | Regularization | Learning rate | Batch size | Iterations | Epochs |
|---|---|---|---|---|---|---|
| Binary cross entropy | Adam | L2 | 0.001 - 0.00001 | 500 | 80 | 30 |

FIG. 17

|  | Sensor 1 | Sensor 2 | Sensor 3 | Sensor 4 | Sensor 5 | Sensor 6 | Sensor 7 | Sensor 8 | Sensor 9 | Sensor 10 |
|---|---|---|---|---|---|---|---|---|---|---|
| Real | 129 | 98 | 23 | 161 | 144 | 226 | 259 | 379 | 208 | 5 |
| Predict | 116 | 99 | 45 | 150 | 117 | 207 | 218 | 326 | 185 | 17 |

FIG. 19

SYSTEMS AND METHODS FOR DECODING CODE-MULTIPLEXED COULTER SIGNALS USING MACHINE LEARNING

CROSS-REFERENCE TO RELATED APPLICATIONS

This application is a national stage filed under 35 U.S.C. § 371 of PCT/US2019/056735 filed Oct. 17, 2019, which claims the benefit of U.S. provisional patent application No. 62/746,578, filed on Oct. 17, 2018, and entitled "Decoding Algorithm of Code-Multiplexed Coulter Sensor Signals via Convolutional Neural Networks," the disclosures of which are expressly incorporated herein by reference in their entireties.

STATEMENT REGARDING FEDERALLY FUNDED RESEARCH

This invention was made with government support under Grant nos. ECCS 1610995 and ECCS 1752170 awarded by the National Science Foundation. The government has certain rights in the invention.

BACKGROUND

Coulter counters excel at rapid enumeration and sizing of suspended particles and therefore find widespread use in different applications such as hematology,[1,2] oncology,[3,4] microbiology,[5,6] pathology,[7,8] pharmacology,[9,10] industrial applications,[11,12] and environmental monitoring.[13,14] What makes Coulter counters practically attractive for those applications is their ability to transduce particle information directly into electrical signals that can readily be interpreted. In a Coulter counter, a pore-bearing membrane is placed between two electrolyte-filled chambers. When the particles of interest, initially suspended in one of the chambers, are driven across the membrane, the electrical impedance is modulated as particles pass through the pore. The number and size of particles can be determined from the number and the amplitude of the intermittent changes in the electrical current, respectively.[15,16]

Coulter counters can also be implemented in lab-on-a-chip (LoC) platforms to create integrated systems for the quantitative characterization of samples. In fact, microfluidic channels manufactured with the photolithographic resolution on LoC devices enable precise pore dimensions that can be tuned to maximize sensitivity and resolve particle coincidences.[17] Capitalizing on these benefits, Coulter counters have been used for a variety of applications including the assessment of cell deformability,[18] impedance cytometry,[19-21] single-cell monitoring,[22,23] nanoscale and molecular characterization,[24,25] DNA sequencing,[26] and protein analysis.[27-29]

While conventional Coulter counters can only count and size suspended particles, it has recently been shown that a network of Coulter counters, when distributed across a microfluidic chip, can be employed to track locations of those particles for microfluidic manipulation-based sample characterization.[30] This technique, Microfluidic CODES, patterns Coulter sensor electrodes to form distinct electrode patterns at various nodes across a microfluidic device so that particles flowing through those nodes produce distinct waveforms.[31-33] Because the whole sensor network is essentially a single Coulter counter with micropatterned electrodes, information coming from different nodes on the device is code-multiplexed in a single output waveform. By decoding this waveform through signal processing (e.g., template matching), it is possible to measure the size, speed, and location of particles manipulated in a microfluidic device. Given that microfluidics offers extensive manipulation capabilities[34] to fractionate cell populations under various force fields, an integrated spatiotemporal readout, such as the Microfluidic CODES, therefore transforms a microfluidic device into a cytometer, capable of measuring the cell properties, based on which, cells are differentially manipulated on the microfluidic device. In fact, using the Microfluidic CODES platform for tracking manipulated cells, electronic cytometers have been developed that can identify cell membrane antigens,[35] measure cell surface expression,[30,36] or determine mechanical properties.[37]

Microfluidic CODES-based cytometers have several advantages over conventional cytometers. First, compared to traditional impedance-based flow cytometers that only count and size cells, the Microfluidic CODES also tracks the location of manipulated cells, providing another dimension of information for cell analysis. Second, the Microfluidic CODES can measure any cell property, not necessarily measurable by a conventional cytometer, as long as the cell property can be used for differential microfluidic manipulation. Third, the use of electrical sensors instead of optical detection allows system integration and miniaturization to realize low-cost and portable systems that can perform as accurate as conventional systems.[30] Finally, compared to imaging-based cytometry, which can also provide spatial information on cell manipulation, the Microfluidic CODES (1) offers a non-rigid "field of view" that can be tuned to any microfluidic platform for cell manipulation, (2) has higher sub-millisecond temporal resolution, which can only be matched by specialized high-speed camera systems and (3) can efficiently compress spatial measurements on cells into an electrical waveform that could be processed more efficiently than a video footage.

How reliably and rapidly the code-multiplexed information from the Coulter sensor network can be processed determines the extent that the complexity of the hardware can be shifted towards software. In a conventional code division multiple access (CDMA) network, codes assigned to individual sources are specifically designed to be mutually orthogonal so that information can be recovered, with a high signal-to-noise ratio, through correlation with a template library.[38,39] Likewise, Microfluidic CODES employed Gold sequences,[40,41] which were designed to remain mutually orthogonal under an asynchronous transmission. While successful in discriminating signals from different sensors even if they interfere due to coincident particles, reliance on specialized code sequences introduces challenges on both the physical and computational aspects of the system. On the physical side, the orthogonality constraint limits the number of Coulter sensors in the network and requires a complex sensor design for scaling.[42] On the computational side, the template matching and iterative approaches like the successive interference cancellation (SIC) are computationally expensive and preclude real-time implementation.

Therefore, a more efficient signal processing technique enabling a straightforward coding scheme is desirable. Such a technique can improve the scalability, performance, and hence, the utility of the Microfluidic CODES-based systems.

SUMMARY

Systems and methods for decoding code-multiplexed Coulter signals are described herein. An example method can include receiving a code-multiplexed signal detected by a network of Coulter sensors, where the code-multiplexed signal includes a plurality of distinct Coulter signals, and inputting the code-multiplexed signal into a deep-learning network. The method can also include determining information indicative of at least one of a size, a speed, or a location of a particle detected by the network of Coulter sensors by using the deep-learning network to process the code-multiplexed signal. The method can further include storing the information indicative of at least one of the size, the speed, or the location of the particle detected by the network of Coulter sensors.

Additionally, the code-multiplexed signal can be a one-dimensional signal.

In some implementations, the distinct Coulter signals can include two or more non-orthogonal signals. Alternatively or additionally, the distinct Coulter signals can include two or more mutually orthogonal signals.

Alternatively or additionally, the code-multiplexed signal can include interfering Coulter signals.

Alternatively or additionally, the deep-learning network can be a convolutional neural network. Optionally, the convolutional neural network is a multi-stage convolutional neural network. For example, the step of determining information indicative of at least one of a size, a speed, or a location of a particle detected by the network of Coulter sensors can include predicting, using the first convolutional neural network, the size of the particle or the speed of the particle based, at least in part, on an amplitude of the signature waveform or a duration of the signature waveform, respectively, and identifying, using a first convolutional neural network, a signature waveform in the code-multiplexed signal. The step of determining information indicative of at least one of a size, a speed, or a location of a particle detected by the network of Coulter sensors can also include predicting, using a second convolutional neural network, the location of the particle based, at least in part, on the signature waveform.

Additionally, the step of predicting, using a second convolutional neural network, the location of the particle based, at least in part, on the signature waveform can include predicting which particular Coulter sensor in the network of Coulter sensors detected the signature waveform. Optionally, the step of predicting, using a second convolutional neural network, the location of the particle based, at least in part, on the signature waveform can include predicting a respective probability that each Coulter sensor in the network of Coulter sensors detected the signature waveform.

Alternatively or additionally, the method can further include providing display data comprising the information indicative of at least one of the size, the speed, or the location of the particle detected by the network of Coulter sensors.

An example method for training a convolutional neural network is described herein. The method can include receiving a non-interfering Coulter signal and creating a non-interfering signal data set. The non-interfering data set can be created by scaling an amplitude of the non-interfering Coulter signal to create a plurality of scaled-amplitude signals, scaling a duration of the non-interfering Coulter signal to create a plurality of scaled-duration signals, and offsetting in time the non-interfering Coulter signal to create a plurality of time-shifted signals. The non-interfering data set includes the scaled-amplitude signals, the scaled-duration signals, and the time-shifted signals. The method can further include generating an augmented training data set comprising a plurality of interfering signals, where each of the interfering signals is created by combining signals selected from the non-interfering signal data set. The method can further include training the convolutional neural network using the augmented training data set.

The method can further include selecting a plurality of signals from the non-interfering signal data set, and combining the selected signals to create an interfering signal. Additionally, the step of selecting a plurality of signals from the non-interfering data set includes randomly selecting signals from the non-interfering data set.

Another example method can include receiving a code-multiplexed signal detected by a network of Coulter sensors, where the code-multiplexed signal includes a plurality of distinct Coulter signals, and inputting the code-multiplexed signal into a machine learning algorithm. The method can also include determining information indicative of at least one of a size, a speed, or a location of a particle detected by the network of Coulter sensors by using the machine learning algorithm to process the code-multiplexed signal. The method can further include storing the information indicative of at least one of the size, the speed, or the location of the particle detected by the network of Coulter sensors. The machine learning algorithm can be a neural network, a support vector machine (SVM), or a Naïve Bayes classifier.

Another example method can include receiving a code-multiplexed signal detected by a network of Coulter sensors, where the code-multiplexed signal includes a plurality of distinct Coulter signals. The method can also include determining information indicative of at least one of a size, a speed, or a location of a particle detected by the network of Coulter sensors by using a statistical method to process the code-multiplexed signal. The method can further include storing the information indicative of at least one of the size, the speed, or the location of the particle detected by the network of Coulter sensors. The statistical method can be an independent component analysis (ICA), a principle component analysis (PCA), or a logistic regression.

Another example method can include receiving the one-dimensional signal, where the one-dimensional signal includes a plurality of source signals, and inputting the one-dimensional signal into a machine learning algorithm. The method can also include determining information indicative of at least one the source signals by using the machine learning algorithm to process the one-dimensional signal. The method can further include storing the information indicative of the at least one of the source signal.

An example sensing platform for use with a network Coulter sensors can include a processor and a memory operably coupled to the processor and a deep-learning network. The processor can be configured to receive a code-multiplexed signal comprising a plurality of distinct Coulter signals. The deep-learning network can be configured to input the code-multiplexed signal received by the processor, and determine information indicative of at least one of a size, a speed, or a location of a particle detected by the network of Coulter sensors by using the deep-learning network to process the code-multiplexed signal. The processor can be further configured to store the information indicative of at least one of the size, the speed, or the location of the particle detected by the network of Coulter sensors.

Additionally, the deep-learning network can be a convolutional neural network. Optionally, the convolutional neural network is a multi-stage convolutional neural network. For example, the multi-stage convolutional neural network can include a first convolutional neural network that is configured to identify a signature waveform in the code-multiplexed signal, and predict the size of the particle or the speed of the particle based, at least in part, on an amplitude of the signature waveform or a duration of the signature waveform, respectively. The multi-stage convolutional neural network can also include a second convolutional neural network that is configured to predict the location of the particle based, at least in part, on the signature waveform.

Additionally, the second convolutional neural network can be configured to predict which particular Coulter sensor in the network of Coulter sensors detected the signature waveform. Optionally, the second convolutional neural network can be configured to predict a respective probability that each Coulter sensor in the network of Coulter sensors detected the signature waveform.

An example system can include a microfluidic device that includes the network of Coulter sensors. The microfluidic device can be configured to detect the code-multiplexed signal. The system can also include the sensing platform described herein. The sensing platform can be operably coupled to the microfluidic device.

Additionally, each of the Coulter sensors can include a plurality of electrodes arranged in proximity to a respective aperture of the microfluidic device.

Alternatively or additionally, each of the Coulter sensors can have a unique electrode pattern.

Alternatively or additionally, each of the Coulter sensors can be encoded, for example, by a respective digital code. In some implementations, the respective digital codes can be randomly generated.

Alternatively or additionally, each of the Coulter sensors can be configured to produce a respective distinct Coulter signal. In some implementations, the distinct Coulter signals can include two or more non-orthogonal signals. Alternatively or additionally, the distinct Coulter signals can include two or more mutually orthogonal signals.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 4A is a schematic showing the multi-stage convolutional neural network workflow. FIG. 4B is a diagram showing the structure of each convolutional neural network of FIG. 4A.

FIGS. 7A and 7B illustrate microfluidic device design according to an implementation described herein. In FIG. 7A, a microscopy image of the code-multiplexed Coulter sensor platform is shown. Gold (Au) electrodes are micropatterned on a glass substrate to form 10 coded Coulter sensors with unique electrode patterns. Ten parallel PDMS microfluidic channels are aligned with sensors. In FIG. 7B, a close-up image of the first coded Coulter sensor with the assigned code sequence of 010101011000101 is shown.

FIG. 8 shows Table 1, which includes ConvNet design parameters (C-size: kernel size of the convolutional layer. C-stride: stride size of the convolutional layer. C-pad: zero-padding of the convolutional layer. Act: type of the activation function. P-size: kernel size of the pooling layer. P-stride: stride size of the pooling layer. Params: number of trainable parameters of the layer. O/P shape: output dimension of the layer.

In FIG. 9A, a search algorithm is implemented to detect waveforms of sensor activity in the raw sensor output signal. A correlation-based algorithm is used to classify each detected sensor signal as a non-interfering sensor waveform or an interfering sensor waveform. In FIG. 9B, a workflow schematic for the digital data augmentation process employed to increase the size of the training dataset is shown.

In FIG. 11A, for a non-interfering sensor waveform, the RPN produces one bounding box that contains the signature waveform. The detected signature waveform is then extracted, normalized, and fed into the SCN. The SCN predicts that this signature waveform is generated using sensor 8 with a probability of 99.5%. FIG. 11B shows simultaneously-recorded high-speed camera image confirms a cell flowing over sensor 8. In FIG. 11C, for an interfering sensor waveform, the RPN produces two bounding boxes for two signature waveforms. The detected signature waveforms are then extracted, normalized, and fed into the SCN. The SCN predicts that these two signature waveforms are generated using sensor 10, with a probability of 97%, and sensor 9, with a probability of 99%, respectively. FIG. 11D shows simultaneously-recorded high-speed camera image confirms two cells concurrently flowing over sensor 10 and sensor 9, respectively.

FIGS. 12A-12J illustrate ConvNets performance characterization. (FIG. 12A) Training and testing results for the RPN bounding box regression accuracy. (FIG. 12B) Testing of cell size estimation accuracy. (FIG. 12C) Testing of cell speed estimation accuracy. (FIG. 12D) Computation speed test results for the RPN. (FIG. 12E) Training and testing results for the SCN sensor identity classification accuracy. SCN confusion matrices for (FIG. 12F) the non-interfering sensor waveforms and (FIG. 12G) the interfering sensor waveforms. (FIG. 12H) Computation speed test results for the SCN. Test results for sensor identity estimation accuracy of the cascaded ConvNets for (FIG. 12I) non-interfering sensor waveforms and (FIG. 12J) interfering sensor waveforms.

(FIG. 13A) Testing of the algorithm accuracy on the training microfluidic device with HeyA8 cells. (I) Cell size and (II) cell flow speed measurements by the algorithm (top) and microscopy (bottom). (III) Sensor identity classification results shown in a histogram comparing the algorithm and microscopy data for the number of cells received by each sensor. (FIG. 13B) Results from the same test (with HeyA8 cells) performed by processing the signals from another but identical microfluidic device (Replica #1) using the already-trained algorithm for cross-platform validation. (FIG. 13C) Cross-platform validation test results with HeyA8 cells from another device (Replica #2). (FIG. 13D) Test results from processing human breast cancer cells (MDA-MB-231) on a non-training microfluidic device for cross-cell type validation of the algorithm. (FIG. 13E) Results from the same test repeated using human prostate cancer cells (PC3) on another non-training microfluidic device.

FIG. 14A shows the device. FIG. 14B shows the waveform produced by each sensor of the device.

FIG. 16 shows Table 3, which shows the structure of the ConvNet used in the multi-label-training method.

FIG. 17 shows Table 4, which shows the classification result for each sensor in the testing data.

FIG. 19 shows Table 5, which shows the classification result for each sensor in the testing data using the multi-label testing method.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Figure 1:
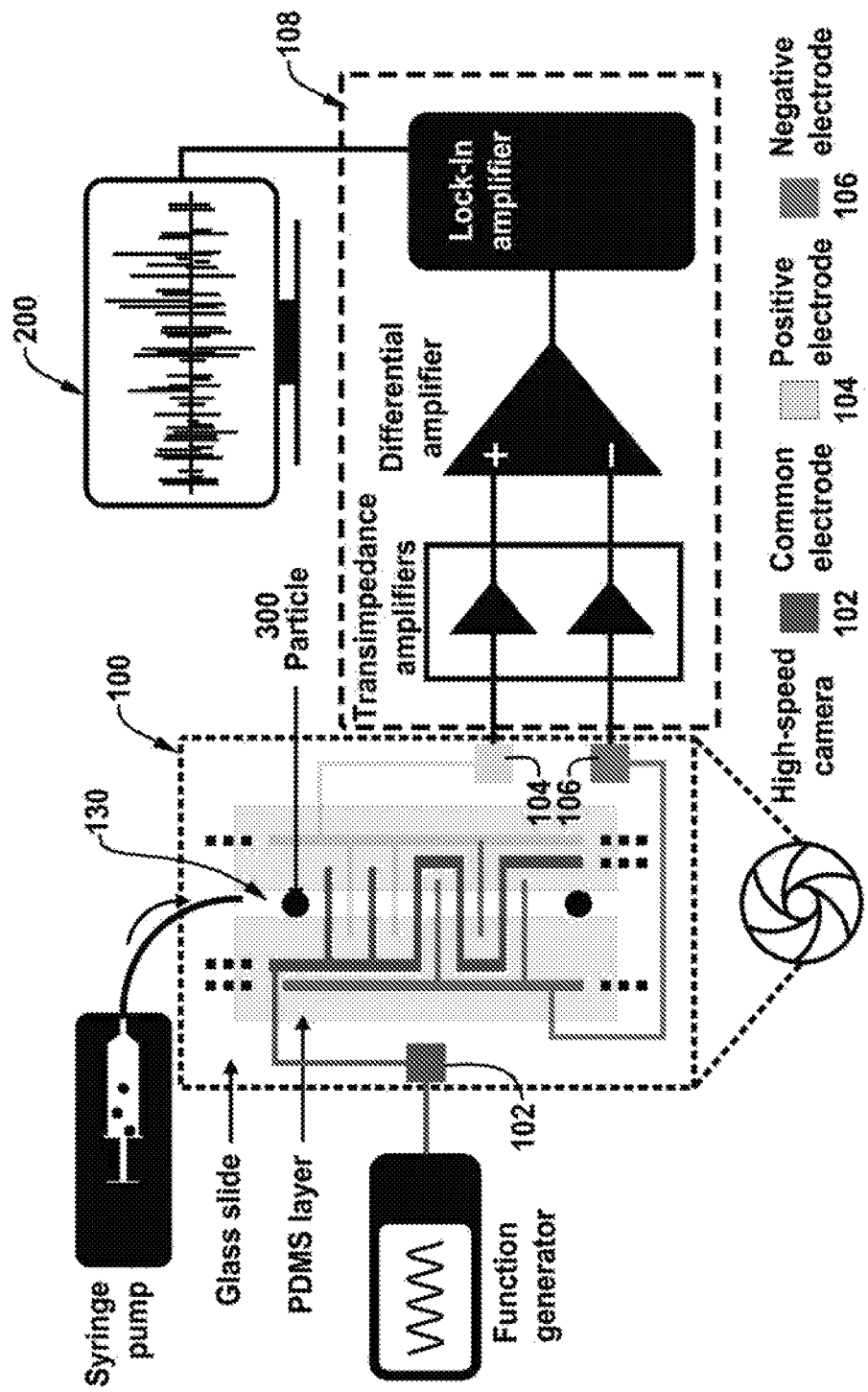
FIG. 1 is a diagram illustrating an example system including a microfluidic device and sensor platform according to implementations described herein.
Figure 2:
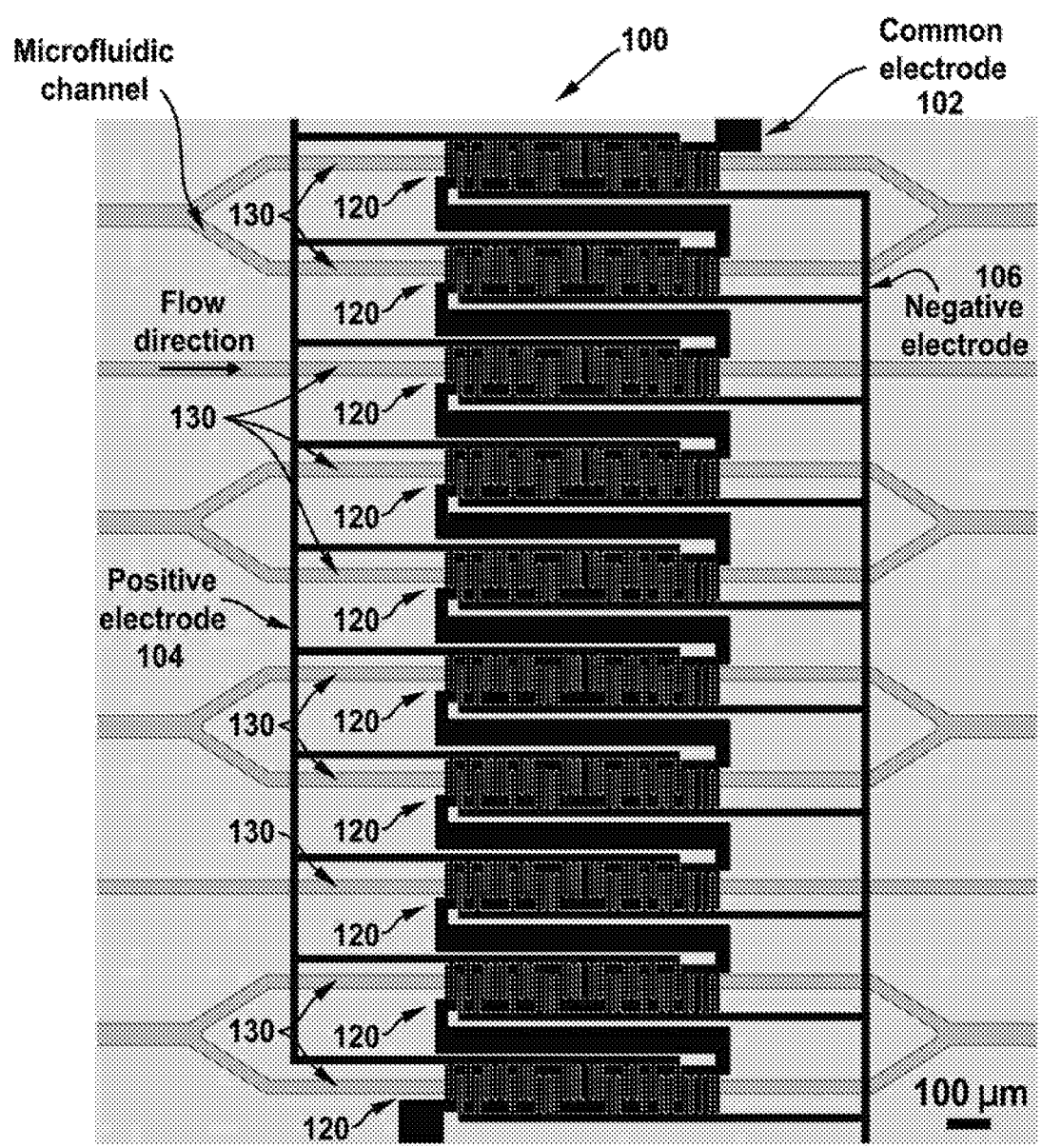
FIG. 2 illustrates an example microfluidic device for use with the system of FIG. 1.

Referring to FIGS. 1 and 2, an example system according to implementations described herein is described. The system can include a microfluidic device 100 and a sensing platform 200. As described herein, the microfluidic device 100 can include a network of Coulter sensors 120. Each of the Coulter sensors 120 can include a plurality of electrodes, which are arranged in proximity to an aperture such as a microchannel 130. Optionally, the microfluidic device can include two layers, e.g., a microfluidic layer having one or more microfluidic channels 130 formed therein and a substrate having one or more electrodes patterned thereon. This disclosure contemplates that the microfluidic layer can be polydimethylsiloxane (PDMS) and that the microfluidic channels 130 can be formed using a soft lithography process. This disclosure also contemplates that the substrate can be glass and that the electrodes 102, 104, 106 can be patterned micropatterned using a lift-off process. It should be understood that the materials and manufacturing processes described above are provided only as examples. Additionally, the microfluidic device 100 shown in FIG. 2 includes a network of ten Coulter sensors 120. It should be understood that the number and/or arrangement of Coulter sensors 120 shown in FIGS. 1 and 2 are provided only as examples and that the network of Coulter sensors can include more or less Coulter sensors, as well as other arrangements, than shown in the figures.

The microfluidic device 100 can include a plurality of electrodes, e.g., a common electrode 102, a positive electrode 104, and a negative electrode 106. As shown in FIGS. 1 and 2, the positive and negative electrodes 104, 106 are arranged in proximity to the microfluidic channels 130. The positive and negative electrodes 104, 106 form a plurality of Coulter sensors 120, which are used to measure the change in electrical impedance as particles 300 (e.g., a cell) traverse the microfluidic channels 130. In particular, the change in electrical impedance measured at each Coulter sensor 120 provides information indicative of the number, size and/or speed of particles traversing a microfluidic channel 130. Each of the positive electrode 104 and negative electrode 106 includes a plurality of fingers, which are arranged in an interdigitated array to form a Coulter sensor. The common electrode 102 is used to supply the excitation signal. The common electrode 102 is routed between the interdigitated fingers of each of the Coulter sensors 120.

Each of the Coulter sensors 120 can have a unique electrode pattern such that each Coulter sensor 120 produces a distinct Coulter signal. As described herein, this facilitates the ability of the sensor platform 200 to differentiate between signals. In some implementations, each Coulter sensor 120 produces a signal that follows a distinct code. In other words, the codes for each Coulter sensor 120 are different. For example, the codes can be randomly generated. In some implementations, the codes are digital (e.g., made up of 1s and 0s). In other implementations, the codes are analog (e.g., analog shapes). As long as the pattern for each Coulter sensor signal is different, the sensor platform 200 can be configured to differentiate between signals. Providing unique electrode patterns facilitates the ability to code-multiplex the Coulter signals from the sensor network onto a single electrical output channel. Coded sensors are described in detail in WO2017/070602, published Apr. 27, 2017, titled "Electronic Sensors for Multiplexed Detection of Particles on Microfluidic Chips and Uses Thereof." As described above, each Coulter sensor 120 includes a positive electrode 104 and a negative electrode 106, each of which has a plurality of fingers. The fingers of the positive and negative electrodes 104 and 106 are interdigitated to form a Coulter sensor 120. Thus, the spatial arrangement of the fingers of the positive and negative electrodes 104 and 106 that form each Coulter sensor 120 can be unique. This can be accomplished by encoding each of the Coulter sensors 120 by a respective digital code (e.g., a 31-bit digital sequence). In some implementations, the respective digital codes are randomly generated. Alternatively or additionally, in some implementations, the distinct Coulter signals can include two or more non-orthogonal signals. Alternatively or additionally, in some implementations, the distinct Coulter signals can include two or more mutually orthogonal signals. As described herein, when using a deep-learning network to decode the code-multiplexed Coulter signals, there is no requirement that the Coulter signals be mutually orthogonal, which is required by conventional CDMA techniques. Requiring mutually orthogonal signals for the purposes of decoding has drawbacks including, but not limited to, placing limitations on the number of sensors and/or increasing the complexity of the encoding/decoding processes. Additionally, the code-multiplexed signal can include interfering Coulter signals.

The microfluidic device 100 can be operably coupled to the sensing platform 200. The sensing platform can include a processor and a memory operably coupled to the processor (e.g., computing device of FIG. 6) and a deep-learning network (e.g., convolutional neural networks 210A and 210B of FIG. 4A). As described herein, the microfluidic device 100 can include a network of Coulter sensors 120. The Coulter signals detected at each of the Coulter sensors 120 is distinct (e.g., coded Coulter sensors 120) such that the Coulter signals can be multiplexed onto the same electrical channel. In other words, the microfluidic device 100 output is a code-multiplexed signal, e.g., a one-dimensional (1D) waveform in the time domain. The code-multiplexed signal includes the distinct Coulter signals detected by each of the Coulter sensors 120 in the network. As described herein, the distinct Coulter signals appear as signature waveforms in the code-multiplexed signal. In some cases, two or more signature waveforms are interfering, e.g., two or more distinct Coulter signals are detected by different Coulter sensors near the same time. This occurs when particles coincidently interact with the different Coulter sensors in the sensor network. Interfering signals complement and/or cancel each other in the time domain. In some cases, two or more signature waveforms are non-interfering, e.g., two or more distinct Coulter signals are detected by different Coulter sensors at different times. It should be understood that interfering signals can be more difficult for the sensing platform 200 to recognize. This disclosure contemplates that the microfluidic device 100 and the sensing platform 200 can be coupled through one or more communication links. This disclosure contemplates the communication links are any suitable communication link. For example, a communication link may be implemented by any medium that facilitates data exchange between the microfluidic device 100 and the sensing platform 200 including, but not limited to, wired, wireless and optical links. Example communication links include, but are not limited to, a local area network (LAN), a wireless local area network (WLAN), a wide area network (WAN), a metropolitan area network (MAN), Ethernet, the Internet, or any other wired or wireless link such as WiFi, WiMax, 3G, 4G, or 5G. As shown in FIG. 1, the sensing platform 200 can include signal acquisition circuitry 108 (e.g., one or more amplifiers and/or conditioning circuitry). Optionally, in some implementations, the signal acquisition circuitry 108 can be included as part of the microfluidic device 100.

Figure 3:
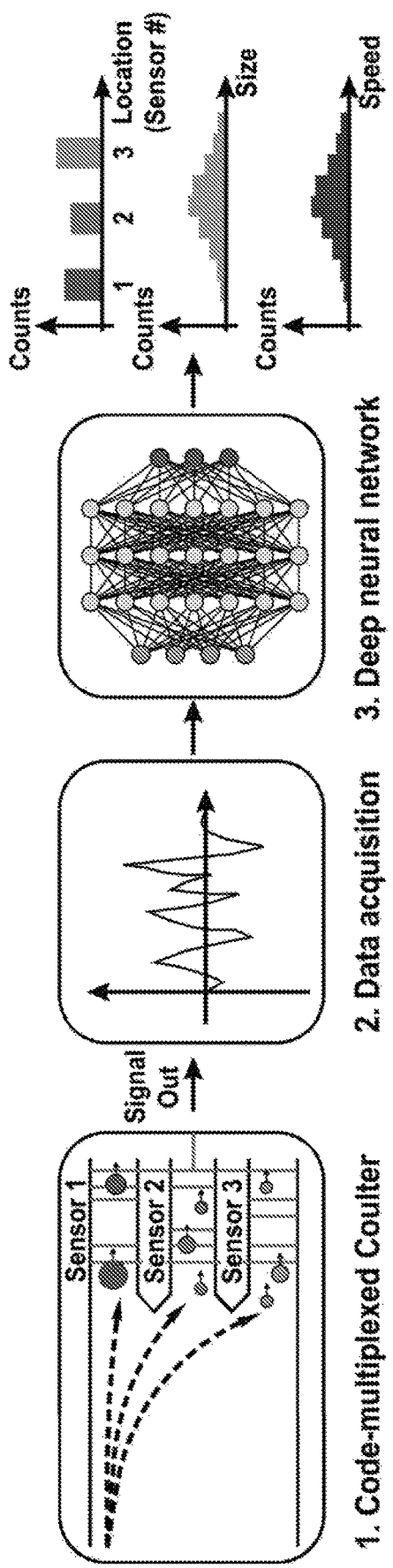
FIG. 3 is a flowchart illustrating an example process workflow for use with the system of FIG. 1. The data is generated using a microfluidic device equipped with a code-multiplexed Coulter sensor network (e.g., FIGS. 1 and 2). A time waveform of the electrical current is acquired through a data-acquisition system. The waveform is processed using a trained deep-learning network such as a neural network, which infers the sensor identity and particle parameters from the signal pattern. Results are classified and aggregated to provide particle statistics.

Referring now to FIG. 3, the process workflow of the system of FIG. 1 is described. As described above, the microfluidic device (e.g., microfluidic device 100 of FIGS. 1 and 2) includes a network of Coulter sensors (e.g., Coulter sensors 120 of FIG. 2), and the sensing platform (e.g., sensing platform 200 of FIG. 1) is configured to receive a code-multiplexed signal. The code-multiplexed signal includes the plurality of distinct Coulter signals detected by the network of Coulter sensors. The code-multiplexed signal is input into a deep-learning network, which is configured to determine information indicative of at least one of a size, a speed, or a location of a particle detected by the network of Coulter sensors. The sensing platform (e.g., sensing platform 200 of FIG. 1) is further configured to store the information indicative of at least one of the size, the speed, or the location of the particle detected by the network of Coulter sensors 120. The sensing platform (e.g., sensing platform 200 of FIG. 1) is optionally further configured to display the information indicative of at least one of the size, the speed, or the location of the particle detected by the network of Coulter sensors.

The deep-learning network can be a neural network such as a convolutional neural network. As described above, the code-multiplexed Coulter signal detected by the microfluidic device is a 1D waveform in the time domain. The recognition of signature waveforms in the code-multiplexed signal is analogous to the recognition of objects in a 1-dimensional space. Accordingly, a convolutional neural network, which is used for image analysis applications, can be used. This disclosure contemplates that a convolutional neural network can be trained to recognize signature waveforms in the code-multiplexed signal and provide information about signature waveforms. An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can optionally be arranged in a plurality of layers such as input layer, output layer, and one or more hidden layers. Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement a function (e.g., sigmoid function or rectified linear unit (ReLU) function), and provide an output in accordance with the function. Additionally, each node is associated with a respective weight. ANNs are trained with a data set to minimize the cost function, which is a measure of the ANN's performance. Training algorithms include, but are not limited to, backpropagation through time (BPTT). The training algorithm tunes the node weights and/or bias to minimize the cost function. It should be understood that any algorithm that finds the minimum of the cost function can be used to for training the ANN. A recurrent neural network (RNN) is a type of ANN. ANNs, including RNNs, are known in the art and are therefore not described in further detail herein.

A convolutional neural network (CNN) is a type of deep neural network that has been applied, for example, to image analysis applications. Unlike a traditional neural networks, each layer in a CNN has a plurality of nodes arranged in three dimensions (width, height, depth). CNNs can include different types of layers, e.g., convolutional, pooling, and fully-connected (also referred to herein as "dense") layers. A convolutional layer includes a set of filters and performs the bulk of the computations. A pooling layer is optionally inserted between convolutional layers to reduce the computational power and/or control overfitting (e.g., by downsampling). A fully-connected layer includes neurons, where each neuron is connected to all of the neurons in the previous layer. The layers are stacked similar to traditional neural networks.

Figures 4A, 4B:
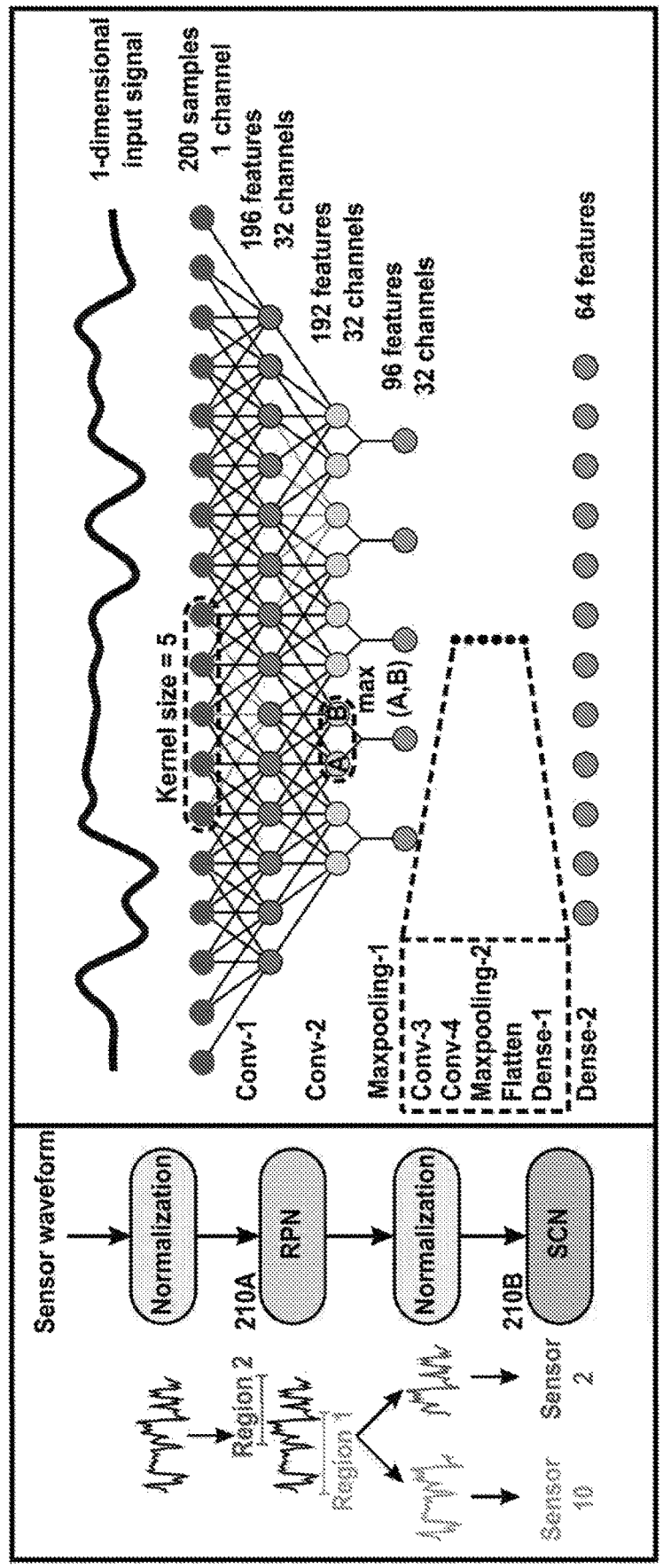
FIGS. 4A and 4B are diagrams illustrating an example multi-stage convolutional neural network for use with the system of FIG. 1.

As described herein, the deep-learning network can be a multi-stage convolutional neural network as shown in FIGS. 4A and 4B. Convolutional neural networks can be used to recognize patterns such as those found in 1D waveforms in the time domain. For example, the multi-stage convolutional neural network can include a first convolutional neural network 210A that is configured to identify a signature waveform in the code-multiplexed signal, and predict the size of the particle or the speed of the particle based, at least in part, on an amplitude of the signature waveform or a duration of the signature waveform, respectively. For example, given the code-multiplexed signal (input signal), the first convolutional neural network 210A (also referred to herein as "first stage ConvNet (RPN)") searches for intervals that contain signature waveforms. The first convolutional neural network 210A is configured to perform regression to search for signature waveforms. The first convolutional neural network 210A uses bounding boxes to identify regions of the code-multiplexed signal that contain signature waveforms. Signature waveforms can be non-interfering (or nonoverlapping) in the time domain. Signature waveforms can be interfering (or overlapping) in the time domain. The first convolutional neural network 210A can search for interfering and non-interfering signature waveforms. For the former, the first convolutional neural network 210A can provide different bounding boxes for each of the signature waveforms. The scale (e.g., height and width) of a bounding box provides information about the amplitude and the duration of a signature waveform. The multi-stage convolutional neural network can also include a second convolutional neural network 210B that is configured to predict the location of the particle based, at least in part, on the signature waveform. The second convolutional neural network 210B is configured to perform classification to identify the particular sensor that detected the signature waveform. For example, the second convolutional neural network 210B (also referred to herein as "second stage ConvNet (SCN)") predicts the sensor identity corresponding to each signature waveform extracted by the RPN. Additionally, the second convolutional neural network 210B can be configured to predict which particular Coulter sensor in the network of Coulter sensors detected the signature waveform. Optionally, the second convolutional neural network 210B can be configured to predict a respective probability that each Coulter sensor in the network of Coulter sensors detected the signature waveform. Both the first and second convolutional neural networks 210A and 210B can use the same structure shown in FIG. 4B. As described above, the deep-leaning network is multi-stage. It should be understood that this is only provided as an example and that this disclosure contemplates using a single convolutional neural network to both recognize signature waveforms and predict information about the signature waveforms. In other words, the regression (which provides information about size and speed) and classification (which provides information about Coulter sensor identity/location) may be performed by a single convolutional neural network.

It should be understood that a convolutional neural network is provided as an example deep-learning network. This disclosure contemplates that other types of machine learning algorithm may be trained to perform the pattern recognition described herein. A convolutional neural network is used due to its ability to recognize patterns or detect objects. This disclosure contemplates that machine learning algorithms other than convolutional neural networks may be used with the systems and methods described herein. For example, machine learning algorithms may include a support vector machine (SVM), a Naive Bayes classifier, or other types of neural networks like recurrent neural network (RNN), modular neural network, etc. Alternatively, this disclosure contemplates that statistical methods such as independent component analysis (ICA), principle component analysis (PCA), and/or logistic regression may be used to perform the pattern recognition described herein.

Figure 5:
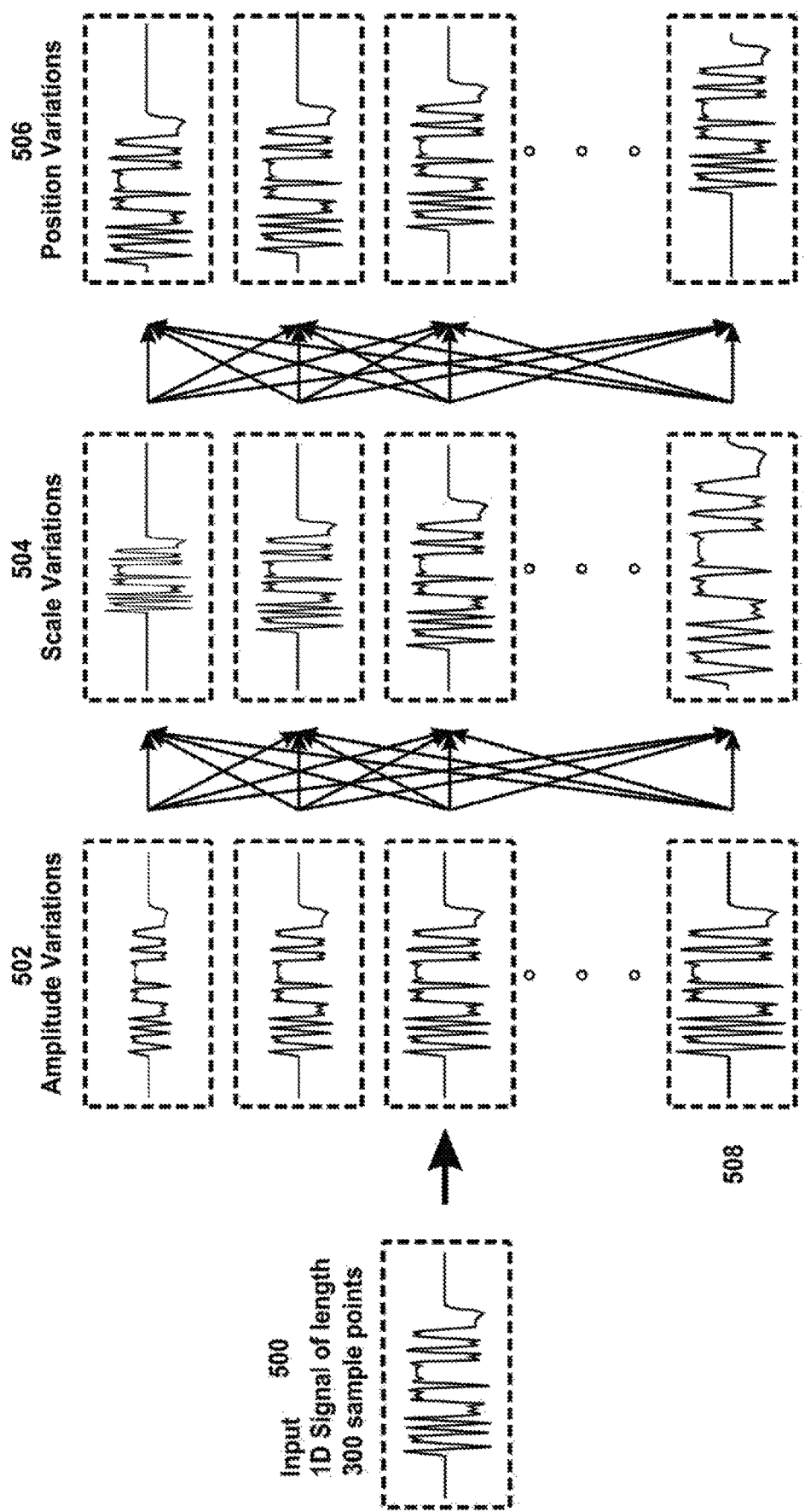
FIG. 5 is a diagram illustrating a process for creating an augmented training data set for training a deep-learning neural network according to implementations described herein.

Referring now to FIG. 5, an example method for training a convolutional neural network is described. The method can include receiving a non-interfering Coulter signal 500. As used herein, a "non-interfering Coulter signal" is a waveform detected by a Coulter sensor in the network at a time when no other Coulter sensors in the network detect a signal. The method can also include altering the non-interfering Coulter signal to generate an augmented training data set. For example, the method can include creating a non-interfering signal data set. The non-interfering data set can be created by scaling an amplitude of the non-interfering Coulter signal to create a plurality of scaled-amplitude signals (shown by 502 in FIG. 5), scaling a duration of the non-interfering Coulter signal to create a plurality of scaled-duration signals (shown by 504 in FIG. 5), and offsetting in time the non-interfering Coulter signal to create a plurality of time-shifted signals (shown by 506 in FIG. 5). Thus, the non-interfering data set includes the scaled-amplitude signals, the scaled-duration signals, and the time-shifted signals. In some implementations, the amplitude, duration, and offset scaling are performed on the non-interfering signal. In other words, each non-interfering signal may be scaled in three aspects, including amplitude, duration, and time shift. A plurality of signals from the non-interfering signal data set can be selected and combined to create an interfering signal. This disclosure contemplates that the steps of selection and combination can be repeated to create a plurality of interfering signals. In some implementations, the step of selecting signals from the non-interfering data set is performed randomly, e.g., altered non-interfering signals are selected at random and then combined. The method can further include generating an augmented training data set comprising a plurality of interfering signals. The method can further include training the convolutional neural network using the augmented training data set.

A method for decoding code-multiplexed Coulter signals using a trained machine learning algorithm such as a deep-learning network is described herein. This disclosure contemplates using a trained machine learning algorithm to decode other 1-dimensional signals with patterns and suffering from mutual interferences. For example, such 1-dimensional signals may include speech signals (e.g., including multiple sound sources such as voices) or electroencephalogram (EEG) signals (e.g., including signals from different parts of the brain). A trained deep-learning network may perform speech signal separation or recognize source signals in an EEG signal. It should be understood that speech and EEG are only two examples of 1-dimensional signals. In other words, a trained machine learning algorithm may be used for separation and recognition of a 1-dimension signal, where the number of source signals is larger than the number of output signals, and each output signal contains multiple source signals, the shape of which might be deformed because of the existence of other source signals (interferences). Thus, another example method can include receiving the one-dimensional signal, where the one-dimensional signal includes a plurality of source signals, and inputting the one-dimensional signal into a deep-learning network. The method can also include determining information indicative of at least one the source signals by using the machine learning algorithm to process the one-dimensional signal. The method can further include storing the information indicative of the at least one of the source signal. This disclosure contemplates that the machine learning algorithm may be a neural network (e.g., convolutional or recurrent neural network), a support vector machine (SVM), or a Naïve Bayes classifier. Alternatively, this disclosure contemplates that a statistical method can be used to decode 1-dimensional signals. Statistical methods may include an independent component analysis (ICA), a principle component analysis (PCA), or a logistic regression.

It should be appreciated that the logical operations described herein with respect to the various figures may be implemented (1) as a sequence of computer implemented acts or program modules (i.e., software) running on a computing device (e.g., the computing device described FIG. 6), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 6:
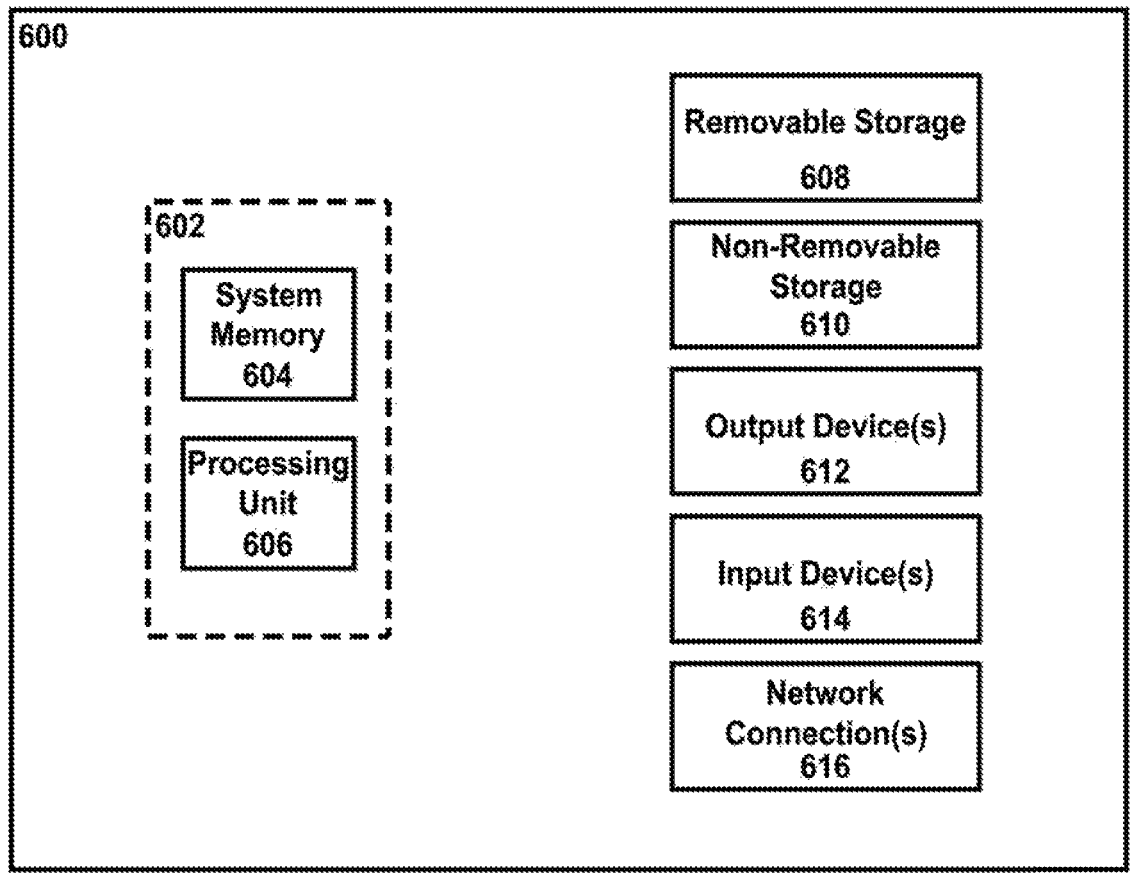
FIG. 6 is an example computing device.

Referring to FIG. 6, an example computing device 600 upon which the methods described herein may be implemented is illustrated. It should be understood that the example computing device 600 is only one example of a suitable computing environment upon which the methods described herein may be implemented. Optionally, the computing device 600 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 600 typically includes at least one processing unit 606 and system memory 604. Depending on the exact configuration and type of computing device, system memory 604 may be volatile (such as random access memory (RAM)), non-volatile (such as read-only memory (ROM), flash memory, etc.), or some combination of the two. This most basic configuration is illustrated in FIG. 6 by dashed line 602. The processing unit 606 may be a standard programmable processor that performs arithmetic and logic operations necessary for operation of the computing device 600. The computing device 600 may also include a bus or other communication mechanism for communicating information among various components of the computing device 600.

Computing device 600 may have additional features/functionality. For example, computing device 600 may include additional storage such as removable storage 608 and non-removable storage 610 including, but not limited to, magnetic or optical disks or tapes. Computing device 600 may also contain network connection(s) 616 that allow the device to communicate with other devices. Computing device 600 may also have input device(s) 614 such as a keyboard, mouse, touch screen, etc. Output device(s) 612 such as a display, speakers, printer, etc. may also be included. The additional devices may be connected to the bus in order to facilitate communication of data among the components of the computing device 600. All these devices are well known in the art and need not be discussed at length here.

The processing unit 606 may be configured to execute program code encoded in tangible, computer-readable media. Tangible, computer-readable media refers to any media that is capable of providing data that causes the computing device 600 (i.e., a machine) to operate in a particular fashion. Various computer-readable media may be utilized to provide instructions to the processing unit 606 for execution. Example tangible, computer-readable media may include, but is not limited to, volatile media, non-volatile media, removable media and non-removable media implemented in any method or technology for storage of information such as computer readable instructions, data structures, program modules or other data. System memory 604, removable storage 608, and non-removable storage 610 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 606 may execute program code stored in the system memory 604. For example, the bus may carry data to the system memory 604, from which the processing unit 606 receives and executes instructions. The data received by the system memory 604 may optionally be stored on the removable storage 608 or the non-removable storage 610 before or after execution by the processing unit 606.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

EXAMPLES

Example 1

Beyond their conventional use of counting and sizing particles, Coulter sensors can be used to spatially track suspended particles, with multiple sensors distributed over a microfluidic chip. Code-multiplexing of Coulter sensors allows such integration to be implemented with simple hardware but requires advanced signal processing to extract multi-dimensional information from the output waveform. In this example, deep learning-based signal analysis is coupled with microfluidic code-multiplexed Coulter sensor networks. Specifically, convolutional neural networks are trained to analyze Coulter waveforms not only to recognize certain sensor waveform patterns but also to resolve interferences among them. This technology predicts the size, speed, and location of each detected particle. It is shown that the algorithm yields a >90% pattern recognition accuracy for distinguishing non-correlated waveform patterns at a processing speed that can potentially enable real-time microfluidic assays. Furthermore, once trained, the algorithm can readily be applied for processing electrical data from other microfluidic devices integrated with the same Coulter sensor network.

Introduction

As described above, a more efficient signal processing technique enabling a straightforward coding scheme is desirable. Recently, machine learning (ML) has become a key research area in data analysis and signal processing. Unlike model-based signal processing, ML focuses on providing a machine with the ability to learn from experience without being explicitly programmed. More specifically, ML-based algorithms update and optimize their internal parameters by learning from an existing dataset (training data) and make predictions on a future unseen dataset (testing data). Currently, ML has been widely used in areas including computer vision[43] and healthcare.[44] Among various ML models, deep learning[45] is a popular learning model for complex pattern recognition tasks. Deep learning is a representation learning method, which allows a machine to automatically learn and discover the representations of input data needed for performing further pattern recognition. Like the vast network of neurons in the brain, a deep learning structure (deep neural network) is based on multiple layers of artificial neurons, each of which is a computational node that is capable of performing a non-linear transformation on its input. In this way, a deep neural network combines the computational power of multiple artificial neurons, and solves highly nonlinear problems, especially in time series processing.[46-48]

In this example, deep learning-enhanced microfluidic Coulter sensor networks, in which code-multiplexed Coulter signals are interpreted by a data-based pattern recognition algorithm, are described. Specifically, a microfluidic system with a network of 10 code-multiplexed Coulter sensors, which are encoded to produce randomly-designed non-orthogonal waveforms, was designed and fabricated. Then a signal processing algorithm based on a convolutional neural network (ConvNet),[49] a specific type of deep learning structure, to interpret sensor signals was built. The device was tested with a cell suspension, and the recorded signals were used to train the algorithm not only to discriminate between different signature waveforms but also to resolve interfering sensor waveforms due to coincident events. The trained algorithm was later employed to analyze experimental data on cell suspensions and characterize its performance by benchmarking against independent measurements using high-speed optical microscopy.

Materials and Methods

System Overview

The workflow of the entire system developed in this work can be divided into three blocks (FIG. 3). First, suspended microparticles were manipulated in a microfluidic device integrated with a code-multiplexed Coulter sensor network. Microparticles, sorted into different locations, were then intercepted by one of the coded Coulter sensors integrated on the chip. Each Coulter sensor in the network was designed with a unique electrode pattern and produced a distinct electrical signal (signature waveform) dictated by the underlying electrode pattern. Second, a data acquisition system was built to drive the Coulter sensor network and measure the impedance changes due to flowing particles by recording intermittent changes in the total electrical current flow in the Coulter sensor network. This detection scheme combined signals from Coulter sensors, distributed on the chip, into a single, 1-dimensional time waveform. This waveform contained different signature waveforms of varying amplitudes and durations coming from individual sensors and also interfering sensors for times when multiple particles coincidently interacted with the sensor network. Third, deep neural networks were designed and trained to interpret the output waveform. Trained neural networks provided the size, flow speed, and sensor identity for each particle detected on the microfluidic chip. Performance characterization of the trained neural network was conducted by processing experimental signals and comparing the with independent measurements using high-speed optical microscopy.

Microfluidic Device Design and Fabrication

As a test platform, a code-multiplexed Coulter sensor network with 10 sensors was designed. Each sensor was designed to produce a distinct but non-orthogonal waveform. To create the codeset, ten 15-bit binary code sequences, where each bit was treated as a Bernoulli random variable with p=0.5, were generated. Specifically, the generated code sequences are:

Sensor 1: 010101011000101;
Sensor 2: 111110001001100;
Sensor 3: 100010100101100;
Sensor 4: 000101110011011;
Sensor 5: 101111001001000;
Sensor 6: 110000100110100;
Sensor 7: 110100011111110;
Sensor 8: 111011000011010;
Sensor 9: 110011111001111;
Sensor 10: 100111110101110.

The sensor network was created on a glass substrate with micromachined electrodes coupled with a microfluidic layer. On the glass substrate, a thin gold layer was patterned to form the sensor network created by three coplanar electrodes: one common electrode to excite the sensor network, and two sensing electrodes, one positive and one negative, to acquire the output signal (FIGS. 7A and 7B). In the sensing region (FIG. 7A), the electrodes were arranged as an interdigitated array with 5 µm-wide electrode fingers separated by 5 µm-wide gaps. For each Coulter sensor, the spatial arrangement of positive and negative sensing electrode fingers was determined by the assigned code sequence. The common electrode was then routed between the sensing electrodes to uniformly excite the sensor network.

The device was fabricated using a combination of surface micromachining and soft lithography. Specifically, the glass substrate with patterned electrodes was fabricated using a lift-off process. A 1.2 µm-thick negative photoresist (NR9-1500PY, Futurrex, Inc.) was patterned on a glass slide using a maskless photolithography system (MLA150, Heidelberg Instruments), followed by e-beam evaporation of a 20/480 Cr/Au film stack. The glass substrate was then immersed in acetone to strip the non-patterned photoresist region and diced into individual chips. The microfluidic layer was made out of polydimethylsiloxane (PDMS) using a soft lithography process. A 15 µm-thick SU-8 photoresist (MicroChem) was spun and patterned on a 4-inch silicon wafer to create the mold. The PDMS prepolymer (Sylgard 184, Dow Corning) was mixed with a crosslinker at a 10:1 ratio, and then poured on the mold, degassed, and baked at 65° C. for >4 hours. The cured PDMS was then peeled off from the mold and punched using a biopsy punch to create the fluidic inlet and outlet. The glass substrate and the PDMS layer were then activated in an oxygen plasma environment, aligned and bonded to form the final device.

Experimental Setup

In this example, human ovarian (HeyA8), breast (MDA-MB-231) and prostate (PC3) cancer cell lines were used as simulated biological samples to acquire experimental data for the training and characterization of the deep learning model. HeyA8 and PC3 cancer cells were obtained from Dr. John F. McDonald in the Georgia Institute of Technology. MDA-MB-231 cancer cells were purchased from the American Type Culture Collection (ATCC). Cells were cultured in a culture medium (Mediatech; Cellgro, Herndon, Va.) supplemented with 10% fetal bovine serum (FBS; Seradigm, Radnor, Pa.) and maintained in a cell culture incubator in 5% $CO_2$ atmosphere at 37° C. Once the cells reached >80% confluence, they were harvested by treating with trypsin, pelleting by centrifugation, and spiking into phosphate buffered saline (PBS) with gentle pipetting.

The cell suspension was then driven through the microfluidic device at a constant flow rate of 500 µL h$^{-1}$ using a syringe pump. A 460 kHz sine wave (2 Vpp) was applied to the common electrodes to excite the Coulter sensor network, and the output signal was acquired from the sensing electrodes and followed a signal path comprised of transimpedance amplifiers and a differential amplifier. A lock-in amplifier (HF2LI, Zurich Instruments) was used to demodulate the signal, and the demodulated signal was sampled into a computer with a sampling rate of 57 kHz for processing. Besides the electrical signal recorded by the described electronic setup, the interactions between the cells and the sensor network were also monitored and recorded simultaneously using an inverted optical microscope (Nikon Eclipse Ti-U, Nikon) equipped with a high-speed camera (Phantom v7.3, Vision Research). The recorded video footage was later used for benchmarking the performance of our algorithm in interpreting the events inside the microfluidic chip.

Deep-Learning Network Design

The deep-learning network described in this example employed ConvNets, which were often used in image recognition because of their effectiveness in representing local saliences in an image. Here, the recognition of signature waveforms was analogized to the recognition of objects in a 1-dimensional space. The ConvNet consisted of several specific artificial layers, including convolutional layers, rectified linear unit (ReLU) layers, pooling layers, and dense (fully-connected) layers. The convolutional layer extracted features from the input feature map using multiple sliding feature detectors (small kernels with specific weights and bias). The ReLU layer introduced non-linear properties to the system. The pooling layers performed downsampling operations to the input feature map, decreasing the number of trainable parameters.

To process the code-multiplexed Coulter sensor signal, a two-stage ConvNet structure (FIG. 4A). The first stage ConvNet was the region proposal network (RPN), which searched an input signal for regions (bounding boxes) that potentially contained signature waveforms. At the same time, the scale of each bounding box was used to estimate the amplitude and duration of the signature waveform providing information on the size and speed of the corresponding particle, respectively. The second stage ConvNet was the sensor classification network (SCN), which was trained to perform sensor-identity classification on signature waveforms extracted from the first stage. The SCN predicted the probability with which the input signature waveform belonged to each and every Coulter sensor in the network integrated on the microfluidic device.

The RPN and the SCN shared the same structure for feature extraction (FIG. 4B). The ConvNet structure was adapted from a study[51] that aims for pattern recognition in grayscale images. The structure was optimized using the Bayesian optimization algorithm.[52] This structure was chosen due to several reasons: (1) the classification of sensor waveforms in an electrical signal is analogous to object recognition in an image frame; (2) grayscale images have only one channel, like the code-multiplexed signal, and therefore, the ConvNet can be compact for faster processing. Both ConvNets contained 4 convolutional layers, each of which was activated by a ReLU layer. A maxpooling layer was placed after the second and the fourth convolutional layers. Two dense layers were placed at last. The model had a total of 217 056 trainable parameters. For reproducibility, detailed information on the ConvNet design parameters is presented in Table 1, which is provided in FIG. 8.

Results and Discussion

Training Data Construction

Figure 9A:
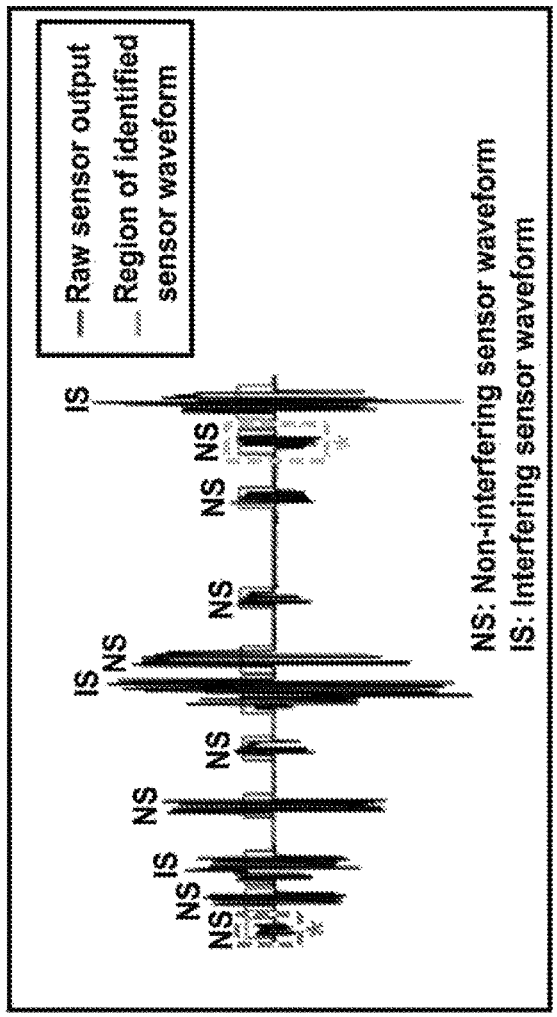
FIGS. 9A and 9B illustrate construction of the training data.

Recorded sensor waveforms were processed to construct the training data for ConvNets. To extract representative sensor waveforms from the raw sensor output signal, a signal-identification program (FIG. 9A). With this program, sensor waveforms were discovered by computing the signal variance within a sliding window as the window traversed the entire raw sensor output signal. The sole purpose of this process was to identify and mark the regions of interest in the raw sensor output signal with potential sensor activity to be used in subsequent operations.

To automatically label each identified sensor waveform with the corresponding sensor identity, a correlation-based algorithm was implemented. By computing the cross-correlation between each extracted sensor waveform with a template library containing all code sequences above, the algorithm obtained two vital pieces of information about each waveform. First, it determined if the waveform was a non-interfering sensor waveform (i.e., contained only one signature waveform), or an interference sensor waveform (i.e., contained multiple signature waveforms interfering with each other). This differentiation was achieved by comparing the amplitude of the primary correlation peak to that of the secondary correlation peak. Second, for each non-interfering sensor waveform, the algorithm identified and labeled its corresponding sensor identity based on the code template that produced the primary correlation peak. At the same time, the power and duration of each labeled non-interfering sensor waveform were also calculated. Labeled non-interfering sensor waveforms were first manually checked for accuracy assertion, then normalized, and used to construct the training data.

To increase the number of waveforms available for constructing the training data, and thereby improve the performance of our ConvNets, a data augmentation process[53] was employed on the labeled non-interfering sensor waveforms. First waveforms were randomly picked from the dataset and then scaled their power and duration in the digital domain to simulate signals for cells that have different sizes and speeds, respectively. In this process, the power and duration of a waveform were treated as random variables, whose distributions were ensured to match those of the original dataset. Additive white Gaussian noise (SNR=30 dB, to mimic the experimental noise level) was then added to each augmented waveform to introduce variation in the training data set against potential overfitting. This pick-and-vary process was repeated to create a waveform database of 1 000 000 augmented non-interfering sensor waveforms to be used for training data construction.

Besides the non-interfering sensor waveforms, a database of interfering sensor waveforms was generated to train the algorithm for resolving data from coincident cells. Interfering sensor waveforms were created in the digital domain by adding two non-interfering sensor waveforms of known amplitudes and durations with a certain time delay. This process was repeated by randomly drawing different pairs of non-interfering sensor waveforms from the waveform database and adding them with a randomly-determined time delay to create a large database that covers different coincidence scenarios. For this work, 150 000 signals were randomly picked from the waveform database to construct a database of non-interfering sensor waveforms and used the remaining 850 000 to construct a database of interfering sensor waveforms.

Figure 9B:
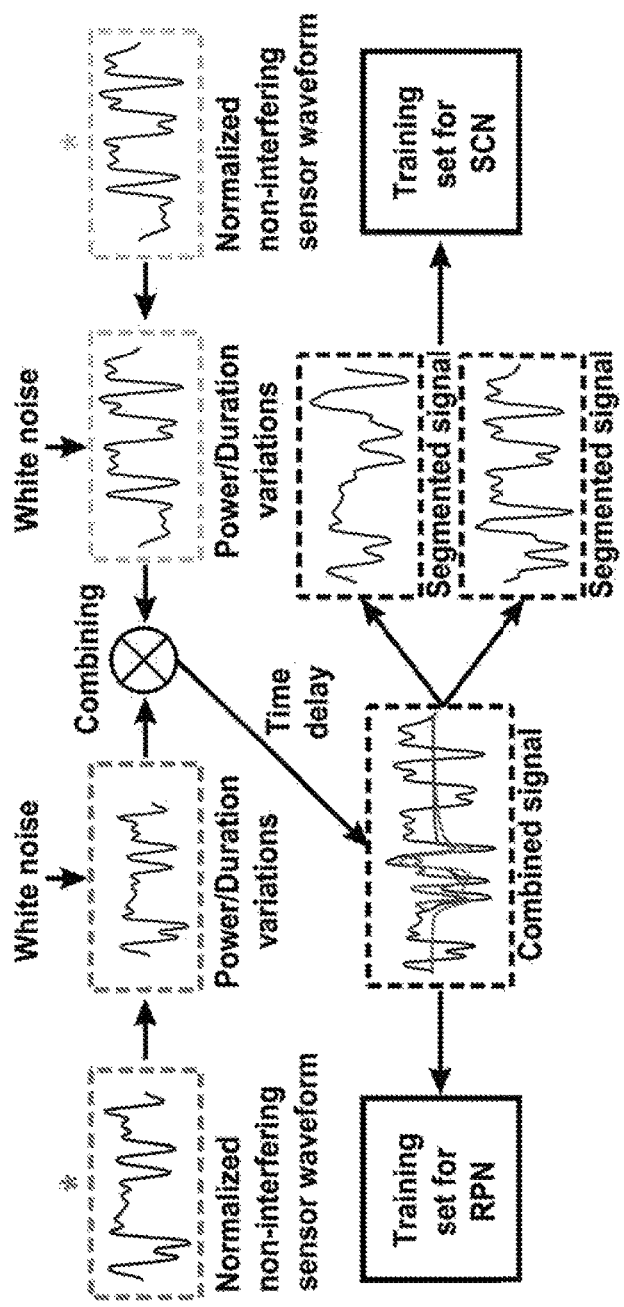

Using the constructed non-interfering and interfering sensor waveform database, different training data was created for the RPN and the SCN because of the specific role each ConvNet played in the algorithm. For the RPN, the training data consisted of non-interfering and interfering sensor waveforms directly from the database along with labels on waveforms' amplitudes and durations. For the SCN, the interfering sensor waveforms needed to be pre-conditioned in the digital domain as if they were already processed using a "perfect" RPN because the RPN output was fed into the SCN in our algorithm. Specifically, this process involved extracting sections of an interfering sensor waveform such that the extracted section includes one of the signature waveforms in full along with parts of the contaminating waveform. The extracted section was then labeled with the sensor identity corresponding to the full signature waveform, and it was used to train the SCN to identify the sensor in the presence of interference (FIG. 9B).

ConvNet Training

Figure 10:
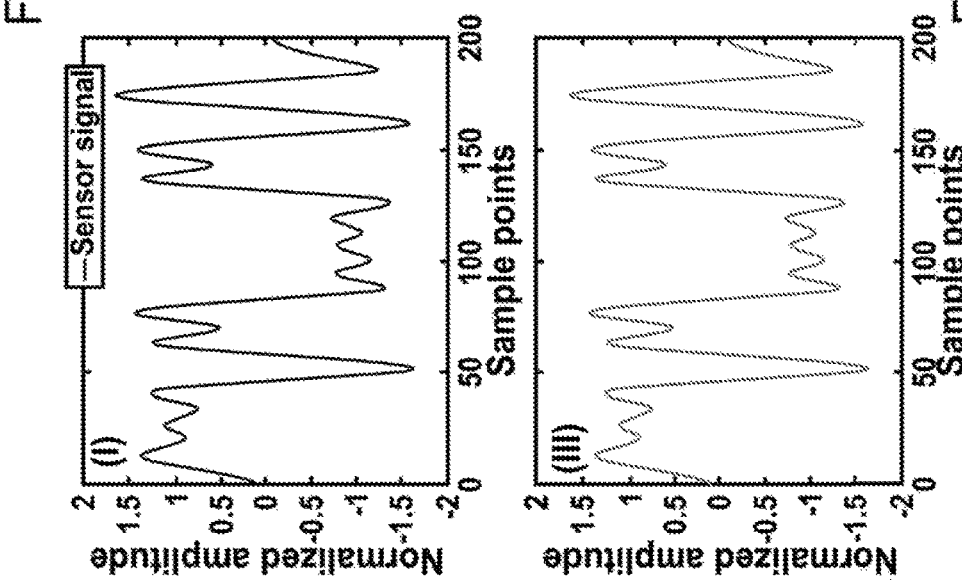
FIG. 10 shows Table 2, which illustrates hyper-parameters for ConvNet training.
Figure 11A:
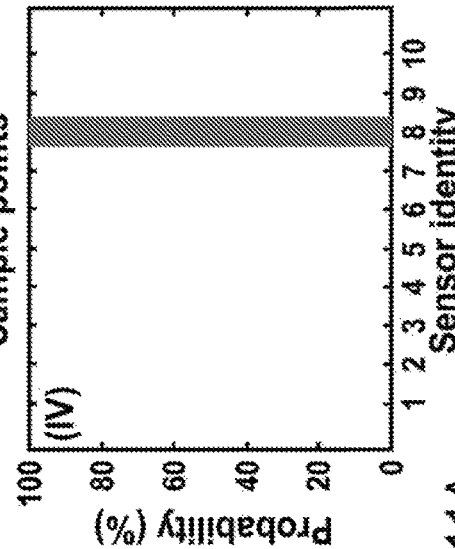
FIGS. 11A-11D illustrate ConvNet decoding process steps.
Figure 11B:
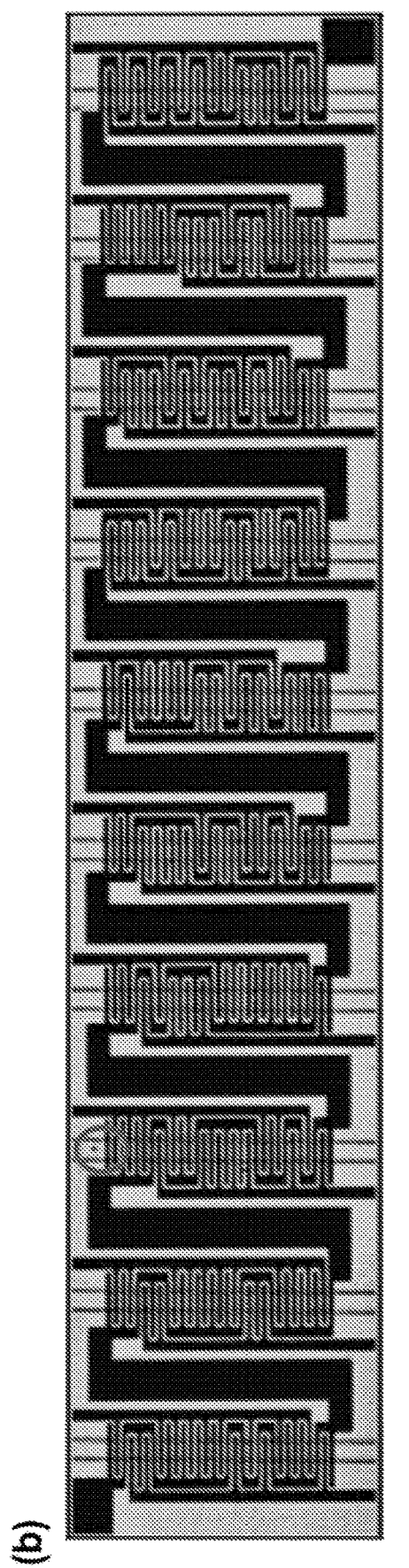
Figure 11C:
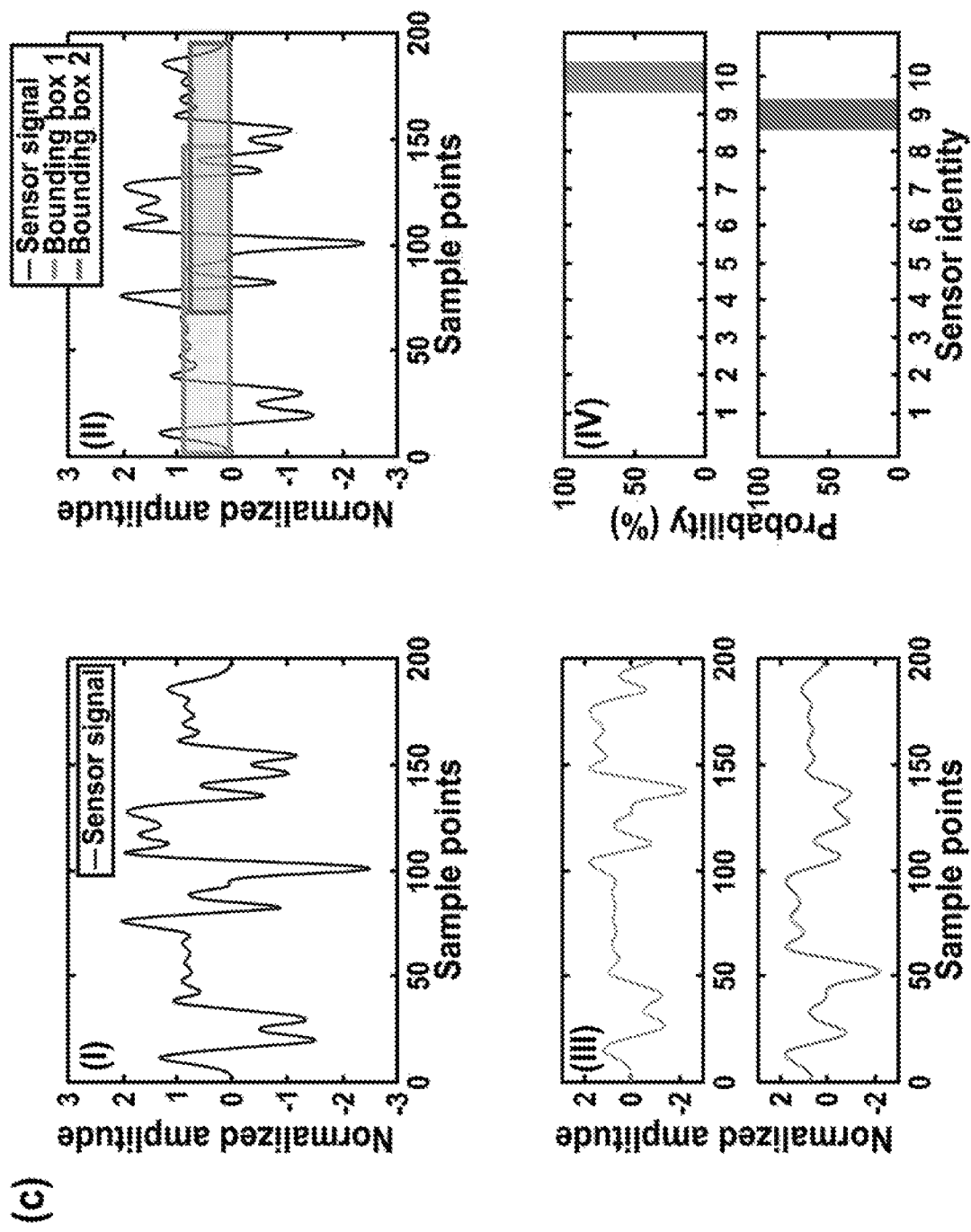
Figure 11D:
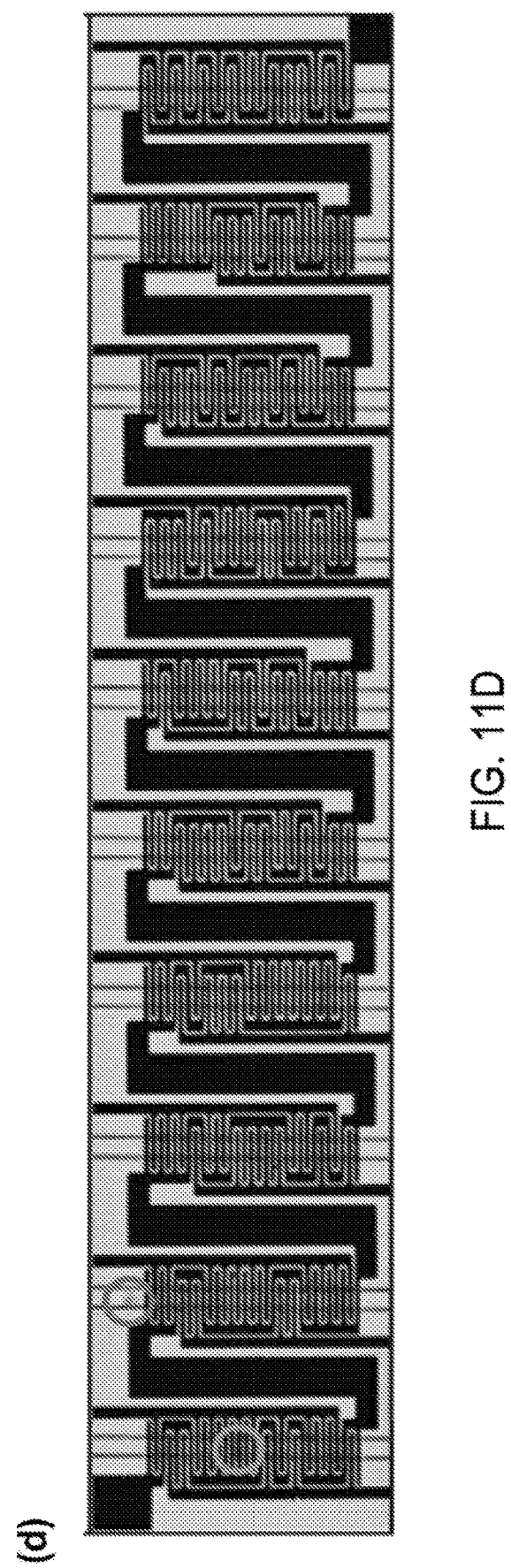

Both ConvNets were trained with a batch size of 500 (batch size: the number of training signals processed before the model is updated) and an epoch number of 50 (epoch number: the number of times the learning algorithm works through the entire training data). In each iteration (iteration number: the number of batches needed to complete one epoch), parameters were updated by employing a stochastic gradient descent (SGD) optimizer. The grid search was used to determine the optimal combination of the learning rate and the momentum. In this process, the learning rate and the momentum were chosen from two different lists ([0.1, 0.01, 0.001, 0.0001, and 0.00001] and [0.5, 0.9, and 0.99], respectively), which were assembled based on typical values used in practice.[54] For the RPN, the mean square error (MSE) was used to compute the error between actual bounding boxes and predicted bounding boxes. For the SCN, the cross-entropy was used to calculate the classification error. Furthermore, L2 regularization was employed in training the SCN to prevent overfitting. Hyper-parameters for training the networks are shown in Table 2, which is provided in FIG. 10.

To interpret the trained ConvNets, the learned parameters of kernels in each convolutional layer (FIG. S1[†]) were visualized. The kernels in the first two convolutional layers (FIGS. S1$a$ and $b^†$) learned first-order features in a coded sensor waveform such as orientations and amplitudes of individual pulses. In deeper convolutional layers, the patterns of kernels became more complex, indicating that the last two layers represented more abstract information, including slopes and transitions between two adjacent pulses (FIGS. S1$c$ and $d^†$). This observed hierarchical representation matches with the fact that a ConvNet interprets the input as a hierarchy of features with increasing abstraction.[45] In the ConvNet, a few kernels in deeper layers showed noisy patterns, indicating that these kernels were not activated given the specific training data.

ConvNet Querying

Trained ConvNets were then used to process experimental signals. For non-interfering sensor waveforms (FIG. 10A, I), as the input contained only one signature waveform, the RPN only produced one valid bounding box (FIG. 10A, II). Then the input signal was clipped according to the bounding box, and the extracted waveform was normalized in power and duration (FIG. 10A, III). The normalized waveform was fed into the SCN for sensor identity classification. The sensor identity was determined by the index of the output node with the highest probability value (FIG. 10A, IV). For interfering sensor waveforms (FIG. 10C, I), multiple bounding boxes were identified (FIG. 10C, II). The predicted bounding boxes had different lengths and heights, according to different durations and amplitudes of the detected signature waveforms, respectively. Similarly, the waveform in each bounding box was then extracted, normalized, and processed by the SCN (FIG. 10C, III). The SCN then determined the identities of the two sensors that detected the cells and provided the confidence levels for its prediction (FIG. 10C, IV). The algorithm predictions were validated using a simultaneously recorded high-speed video of the cell flowing in the device (FIGS. 10B and 10D).

ConvNets Testing

Testing of Waveform Boundary Estimation

To test the ConvNets, two testing datasets, one for single cells and another for coincident cells, were constructed. Each of these sets contained signature waveforms from 900 cells. Each ConvNet was then tested separately with these two testing datasets for non-interfering and interfering sensor waveforms. For the RPN, the bounding box regression accuracy on non-interfering sensor waveforms was higher than that on interfering ones (FIG. 12A). This difference was expected as the bounding box for a non-interfering sensor waveform was the entirety of the input sensor waveform with only one signature waveform present. In contrast, for an interfering sensor waveform, the interference between signature waveforms resulted in less predictable boundaries effectively leading to lower accuracy. It was observed that the accuracy of the RPN for both non-interfering and interfering sensor waveforms increased with the training epoch number and remained stable after 45 epochs (FIG. 12A). A final testing accuracy of 97% on non-interfering sensor waveforms, and 92% on interfering sensor waveforms at epoch 50 was achieved.

Testing of Cell Size Estimation

The heights of the predicted bounding boxes were used to estimate the sizes of the detected cells. Because the height of each predicted bounding box corresponded to the amplitude of the identified signature waveform, it could be used to determine the cell volume, according to the Coulter principle.[55] Following the calibration of the signal amplitude for cell size using microscopy images, algorithm predictions were compared with the actual size data directly calculated from the testing data. To observe the potential effects of interference-induced error in size estimation, non-interfering (FIG. 12B, I) and interfering (FIG. 12B, II) sensor waveforms were analyzed separately and observed that the resulting size distributions closely matched with each other. Furthermore, the size measurements from the algorithm also agreed well with the size distribution directly calculated from the testing data (FIG. 12B, III).

Testing of Cell Speed Estimation

For the speed estimation, the length of each predicted bounding box, which corresponded to the duration of the identified signature waveform, was used. Because the duration of the waveform provided the residence time of a flowing cell in the sensing region, by combining the waveform duration with the physical length of the coded sensor, it is possible to calculate the speed of each cell. Using the algorithm, the flow speed for single (FIG. 12C, I) and coincident (FIG. 12C, II) cells were calculated separately. The calculated speed distributions for both tests matched, demonstrating the negligible effect of sensor interference on cell speed estimations. The results were also in close agreement with the speed data (FIG. 12C, III) directly calculated from the testing data.

Testing of Sensor Identity Classification

Figure 12E:
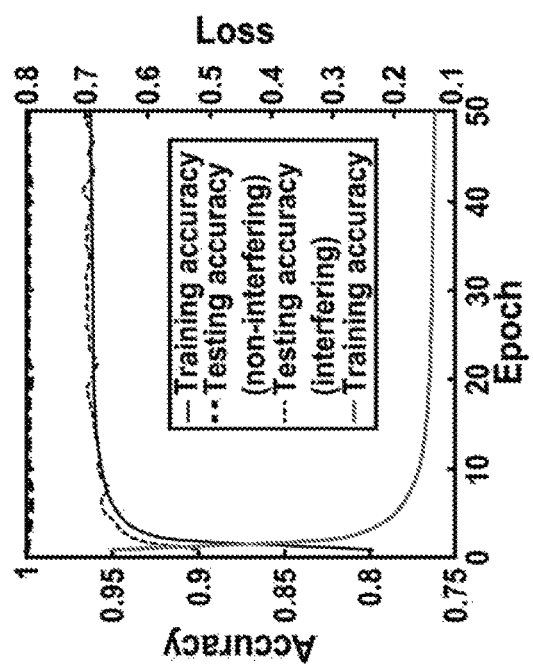
Figure 12F:
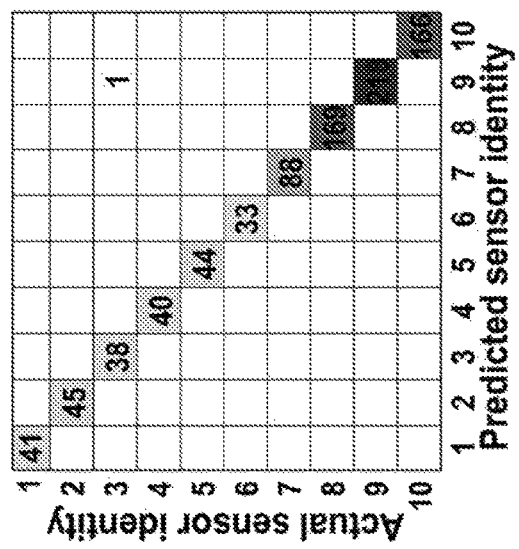
Figure 12G:
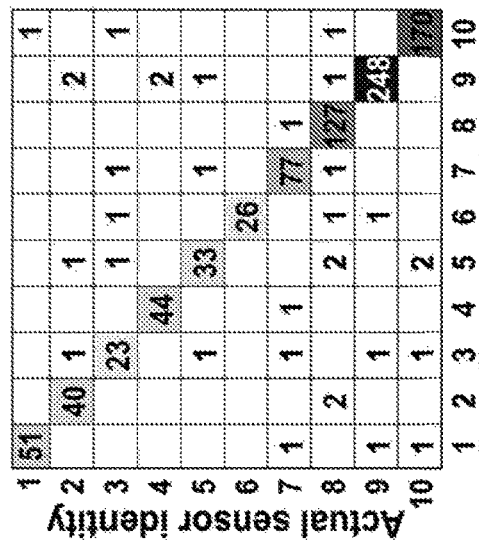

The SCN alone was tested to evaluate its accuracy in sensor identity classification for non-interfering and interfering sensor waveforms. The classification accuracy for non-interfering sensor waveforms was found to be higher than that of interfering ones (FIG. 12E). This difference was expected because a non-interfering sensor waveform faithfully followed the pattern of the assigned code sequence. While deviations could result from differences in the shape, size, and vertical position of a cell, these were often not at a level to negate the underlying signature waveform. However, for an interfering sensor waveform, part of a signature waveform was by definition distorted by contaminating signature waveforms. The partial deviation could be significant enough, especially if the interfering cells were larger, to dominate the signature waveform pattern and lower the classification accuracy. Nevertheless, a testing accuracy of 99% for non-interfering sensor waveforms and 95% for interfering sensor waveforms was achieved. Furthermore, confusion matrices for the tests of non-interfering (FIG. 12F) and interfering sensor waveforms (FIG. 12G) did not present a misclassification bias for any specific sensor combination.

Testing of the Complete Deep-Learning Network

The testing of the algorithm was completed by cascading the RPN and the SCN. In this setting, each testing signal was first processed using the RPN, and the extracted signature waveforms were then classified using the SCN. The accuracy was calculated by comparing the total number of cells detected by each code-multiplexed Coulter sensor (sensor identity distribution) with the known number of each signature waveform in the testing data (FIGS. 12I and 12J). An accuracy of 97% for single cells and 85% for coincident cells was achieved. The overall testing accuracy for the cascaded ConvNets (i.e., the complete algorithm) was less than the calculated accuracy for a single ConvNet due to the propagation of the error. Specifically, the bounding-box estimation errors that occurred in the first stage (RPN), including occasional missing low-power signature waveforms in interfering sensor waveforms, propagated to the second stage (SCN), resulting in reduced classification accuracy.

Computation Speed Test

Figure 12H:
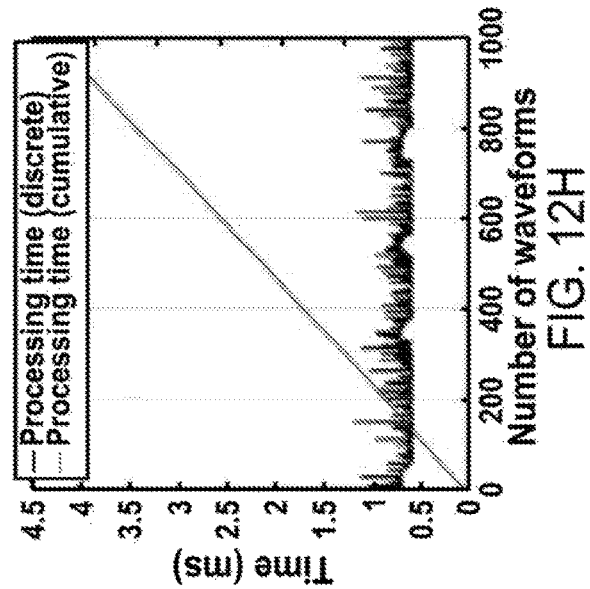

The processing speed is a factor when evaluating an algorithm. To estimate the processing speed, each ConvNet was used to process 1000 input waveforms and recorded the unit processing time for each input (FIGS. 12D and 12H). The cumulative time elapsed as each ConvNet processed those 1000 waveforms was also calculated. As the RPN and the SCN shared the same structure (same number of parameters), they had similar processing speeds. On average, the RPN required ~610 ms, and the SCN required ~670 ms to process 1000 in-put waveforms. Based on these metrics, the two-stage ConvNet structure could process 780 cells per second (2.7 GHz Intel Core i7, Intel). Processing speeds of this order can potentially make real-time analysis possible for a variety of sample types.

Validation Via Optical Imaging

Figure 13A:
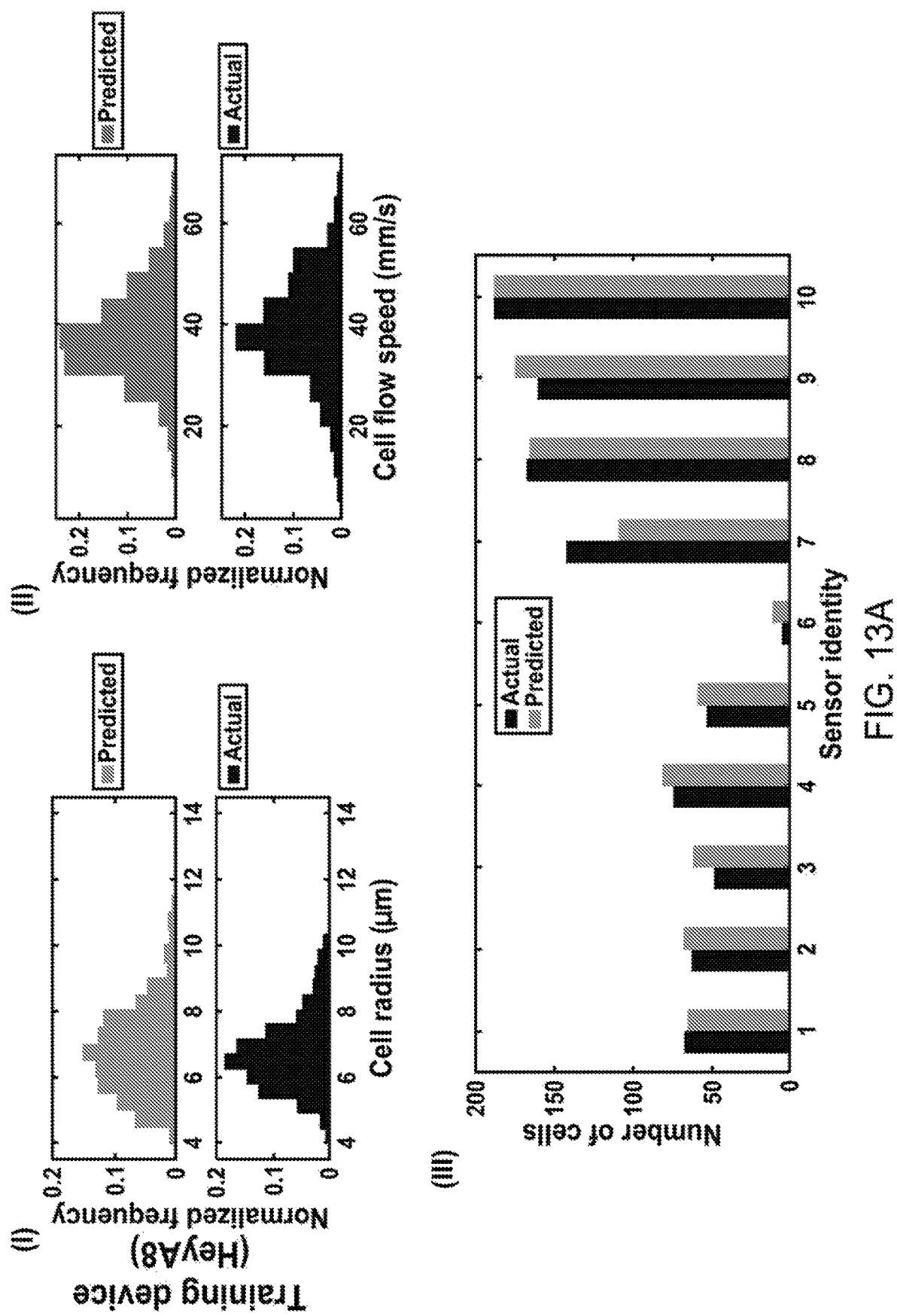
FIGS. 13A-13E show cross-platform and cross-cell type benchmarking of the algorithm against optical imaging.

To independently validate the performance of the algorithm, the algorithm results were compared with a simultaneously recorded high-speed (1000 fps) microscopy video footage of human cancer cells flowing through the microfluidic device. The video was recorded by placing all the sensors within the same field of view so that the whole sensor network activity can be visually acquired. By processing the recorded video of ~1000 cells using a custom-built image-processing program, the speed and the sensor identity for each cell were automatically determined. The cell size distribution was obtained in a separate experiment by imaging cells of the same type and processing the recorded images with the ImageJ software. Microscope-measured cell size (FIG. 13A, I) and cell speed (FIG. 13A, II) histograms closely matched with the prediction. Besides algorithm-induced errors, the differences from optical measurements of cell properties are expected to be due to several factors: (1) the cells used for imaging might have had a different size distribution from the cells detected using the device even though they were sampled from the same tissue culture; (2) the accuracy in cell size measurements might have suffered from calibration errors as well as the sensor-proximity effects in the microfluidic channel; (3) optical cell speed measurements with the high-speed camera are prone to errors from low spatial and temporal resolution. In terms of the sensor identity prediction, the algorithm was able to identify the correct sensor with an overall accuracy of 90.3% (FIG. 13A, III). These results validated the ability of the algorithm to accurately capture the microfluidic activity of the cells and their characteristics.

Cross Platform Validation

To be of practical utility, trained ConvNets can be directly applicable to signals from other LoC devices with identical sensor designs. Furthermore, using the same device to generate both the training and testing signals might artificially enhance the measured accuracy of the algorithm. Therefore, the cross-platform operability was tested by training the algorithm on data from one device and testing its performance on other devices. For this purpose, two microfluidic devices, which were replicas of the original device (the training device) used in this study, were fabricated. Even though all the three devices had the same electrode design, their signature waveforms for each Coulter sensor were expected to show observable differences due to variations from the fabrication processes and the electrical contacts.

Figure 13B:
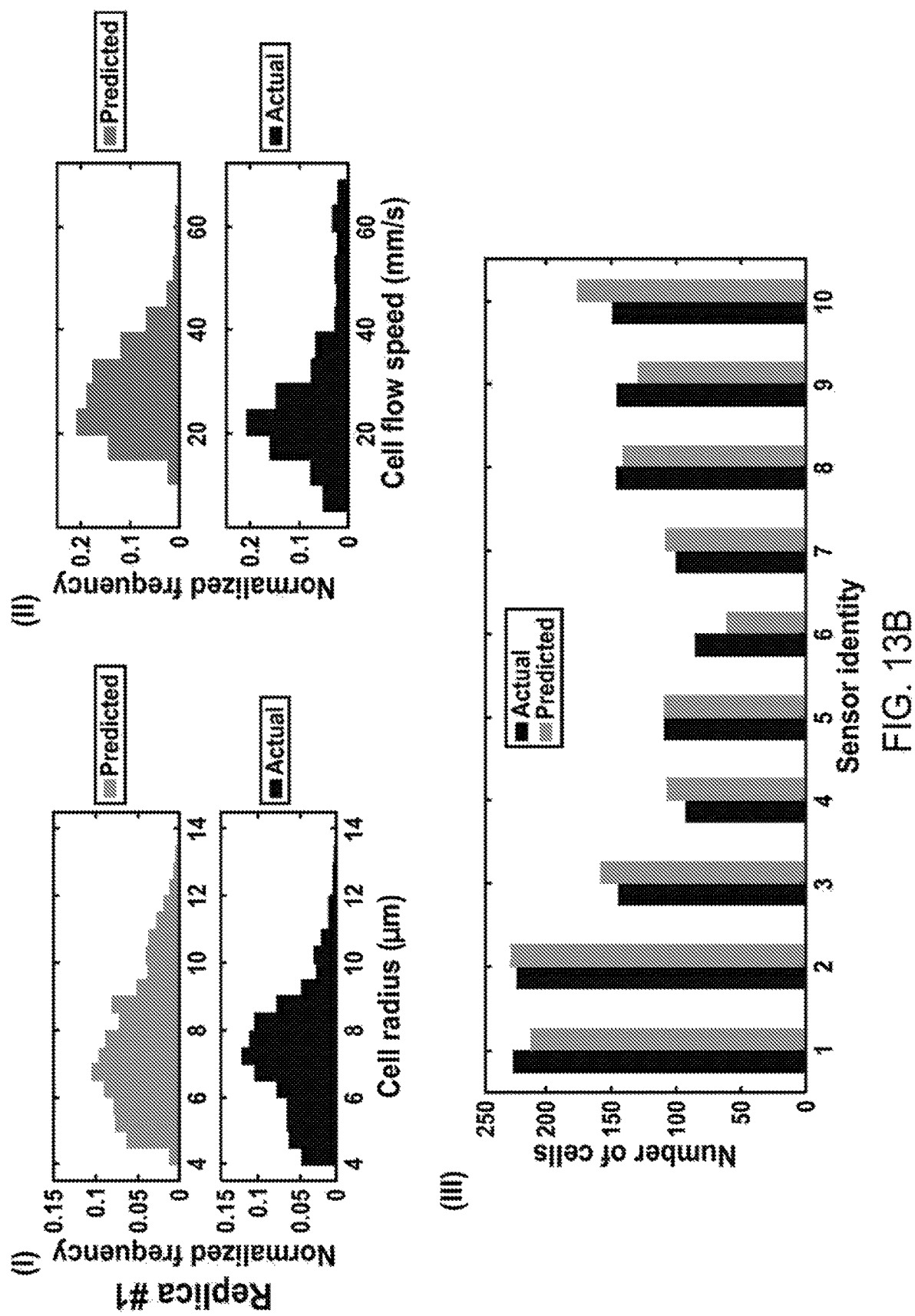
Figure 13C:
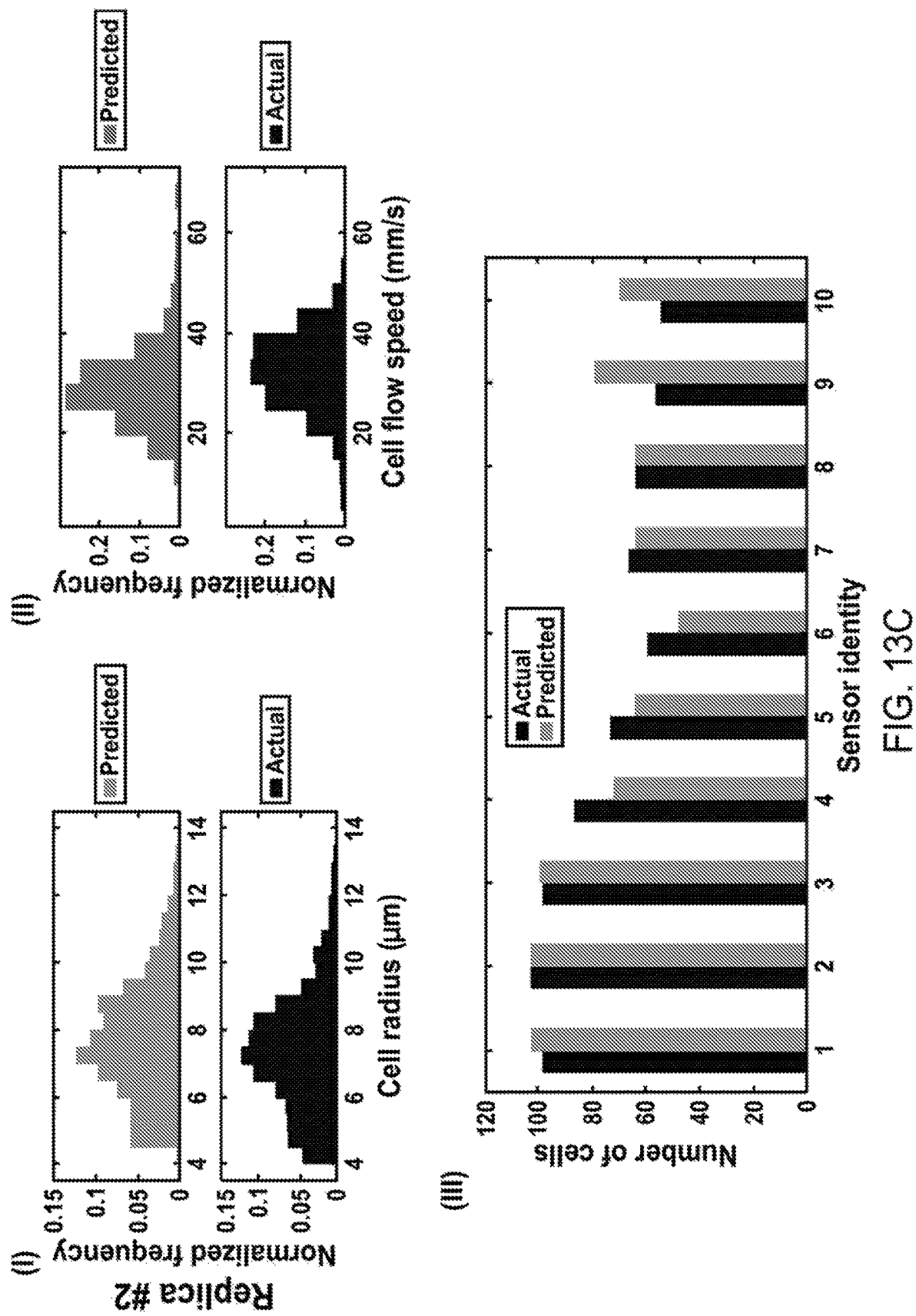

About 1000 human ovarian cancer cells sampled from the same PBS suspension were processed with each replica microfluidic device. High-speed microscopy videos were recorded as a benchmark to determine the cross-platform accuracy of the algorithm. Similar to above, the videos were processed, and microscopy measurements were compared with the algorithm predictions for the cell size, cell flow speed, and sensor identity. For both replica devices, the microscope-measured cell size (FIGS. 13B, I and 13C, I) and flow speed (FIGS. 13B, II and 13C, II) distributions matched closely with the algorithm results, yielding similar mean and variance. As for sensor identities, 90.65% (FIG. 13B, III), and 89.42% (FIG. 13C, III) accuracy were achieved on Replica #1 and Replica #2, respectively. These accuracies were virtually the same with the accuracy we achieved with the training microfluidic device. Taken together, these results demonstrated the robustness of our trained ConvNets against cross-platform waveform variations, leading to the conclusion that a pre-trained network could directly be used to interpret sensor signals from different microfluidic designs, as long as the same set of code sequences was used in the sensor network.

Cross Cell Type Validation

Figure 13D:
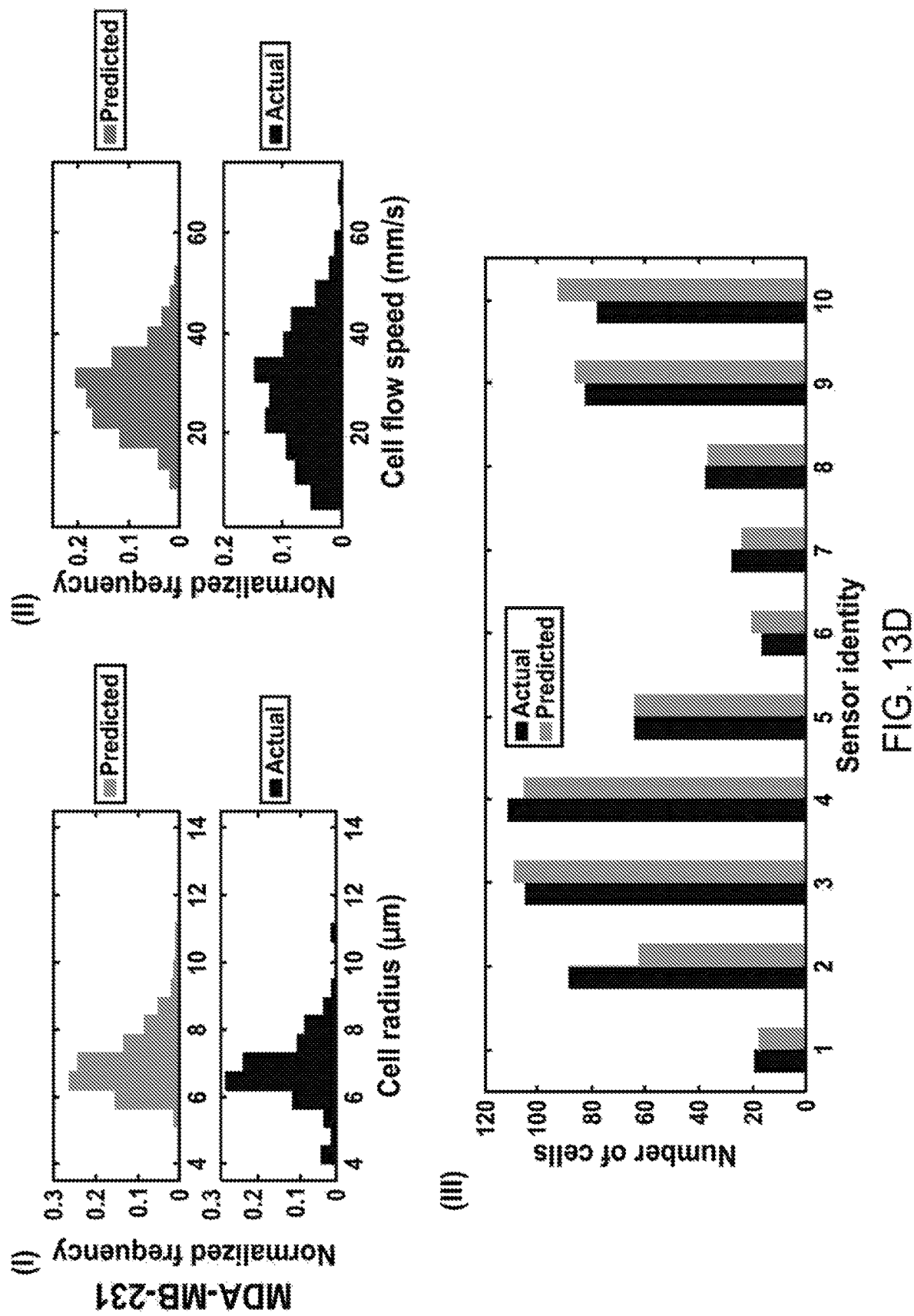
Figure 13E:
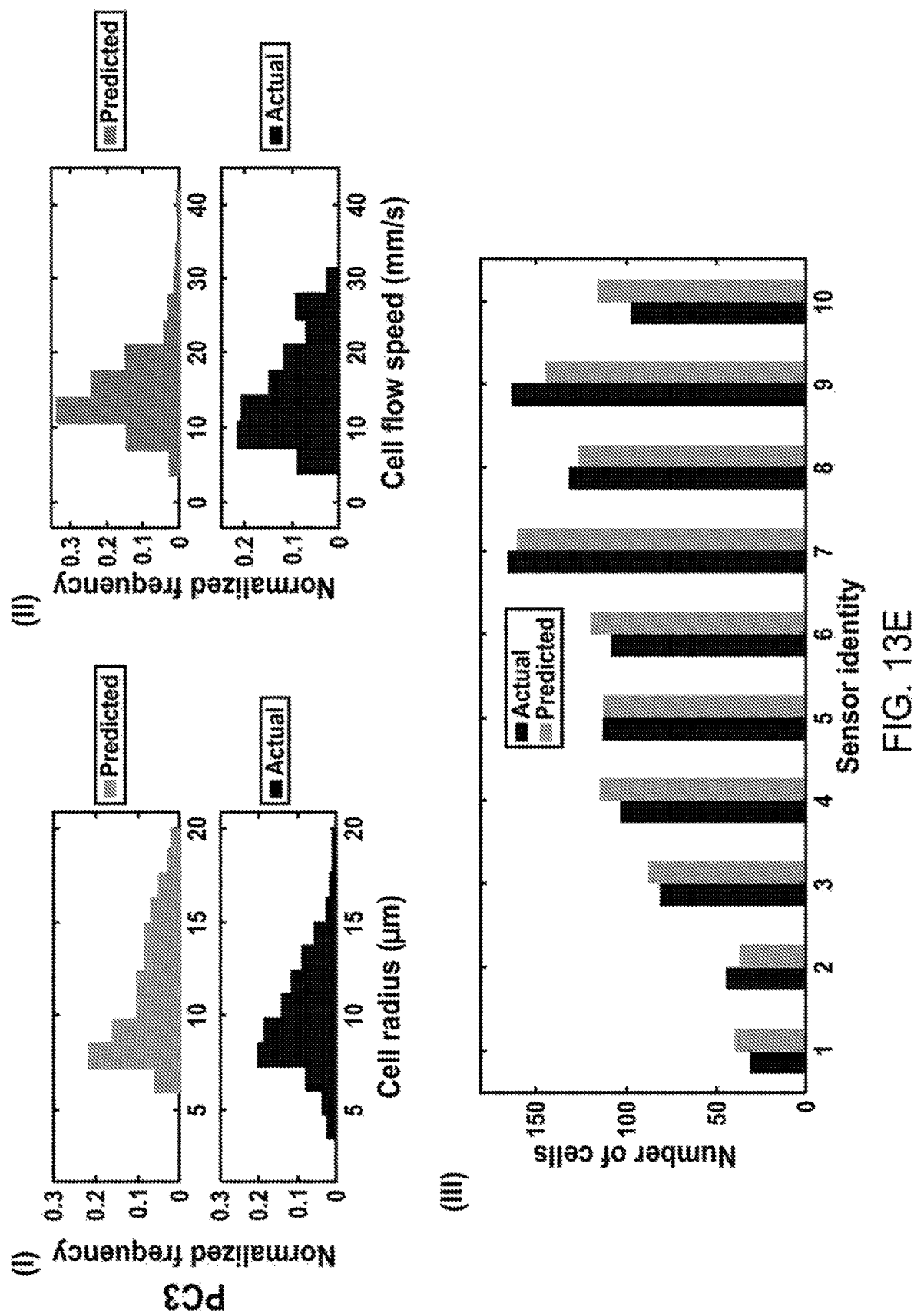

To be used in a variety of applications, trained ConvNets should be directly applicable to signals generated by any cell type. Therefore, the cross-cell type compatibility of the technique was tested by applying our ConvNet, trained with human ovarian cancer cells (HeyA8) to interpret signals from the processing of human breast (MDA-MB-231) and prostate (PC3) cancer cell lines. For these measurements, two identical microfluidic devices (replicas of the training device) were fabricated and separately processed the two cell lines on these devices. Simultaneously-recorded high-speed microscopy videos were treated as the ground truth to calculate the cross-cell type accuracy. For both cell lines, the microscope-measured cell size (FIGS. 13D, I and 13E, I) and flow speed (FIGS. 13D, II and 13E, II) distributions matched closely with the algorithm results, yielding similar mean and variance. As for sensor identities, 89.76% (FIG. 13D, III), and 91.11% (FIG. 13E, III) accuracy on MDA-MB-231 and PC3, respectively, was achieved. These results demonstrated the compatibility of trained ConvNets with different sample types and the potential of our technique for general-purpose cytometry applications.

CONCLUSION

Besides their conventional use for sizing and counting suspended particles, Coulter counters can be patterned to produce location-specific electrical waveforms and can therefore serve as sensor networks for tracking those particles. This additional layer of spatial information can successfully be extracted by processing the output signal via a deep learning-based algorithm that employs ConvNets. ConvNets are well suited for pattern recognition problems and can discriminate between non-correlated sensor waveforms with high accuracy. Moreover, ConvNets can be trained to recognize interference patterns of Coulter sensor waveforms to resolve data from coincident particles. Computationally, the pattern recognition process is efficient and can potentially enable real-time microfluidic assays for quantitative measurements on particle suspensions. Finally, an algorithm, trained on an instance of a Coulter sensor network, can perform equally well on different microfluidic devices equipped with an identical sensor network demonstrating that the presented approach can readily be employed for biomedical applications.

Example 2

In this example, systems and methods for decoding of Microfluidic CODES signals are described. Specifically, two deep learning (see Lecun, Yann. "Deep Learning & Convolutional Networks." 2015 *IEEE Hot Chips* 27 *Symposium (HCS)*, 2015) based signal processing algorithms, and more specifically, convolutional neural networks (ConvNets) (see Krizhevsky, Alex, et al. "ImageNet Classification with Deep Convolutional Neural Networks." *Communications of the ACM*, vol. 60, no. 6, 2017, pp. 84-90) are used to implement the algorithms. FIG. 3 presents the high-level idea of the technology. In the block of "Deep neural network", two methods are used to build and implement the network. The first method is by implementing a multi-label training strategy, which assigns multiple labels to a signal, so that each sensor output can belong to multiple Coulter sensors. The second method implements two deep neural networks, one to identify signature waveforms contained in a signal, and the other to assign a single label to identified signature waveforms. The deep-learning based algorithms free Microfluidic CODES from relying on the CDMA principle as previously implemented, simplifying the design scheme of Microfluidic CODES. At the same time, they maintain a high decoding accuracy, and largely increases the signal processing speed compared with our previously implemented algorithm, allowing a further real-time particle analysis.

Multi-Label Training Method

The multi-label training strategy to train the ConvNet was implemented. Multi-label classification is used when each input instance is associated with several labels. That is to say, each input sensor signal to the ConvNet can belong to several different sensors, so that when signal interfering happens, multiple sensors are assigned to the interfering signal.

Figures 14A, 14B:
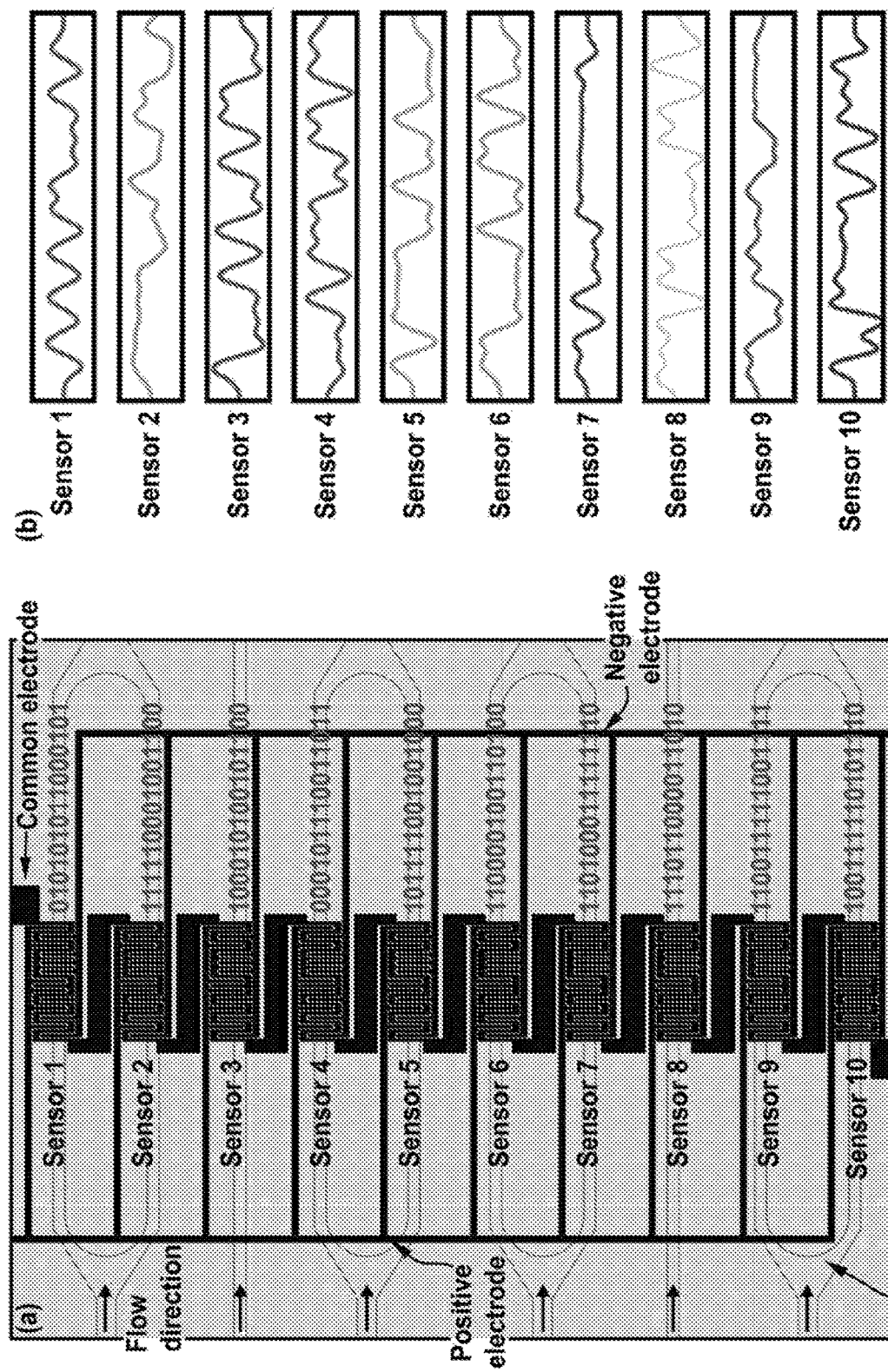
FIGS. 14A and 14B illustrate another example microfluidic device used for multi-label testing as described herein.

Using ConvNet based decoding algorithm largely simplifies the designing metrics of the device. The multi-label classification does not rely on the orthogonality of the interfering signals, so it does not need to follow certain rules when designing the spreading sequences. That is to say, all the spreading sequences can be randomly generated, and the length of the sequences can be much shorter than corresponding Gold sequences we used in previous designs. To prove the principle, a new Microfluidic CODES platform with ten microfluidic channels. Each channel is equipped with a Coulter sensor that was designed based on a new set of spreading sequences. Each member of the sequence set is a 15-bit bi-polar sequence, which is only half the length comparing with the spreading sequences used in our previously designed 10-channel Microfluidic CODES device. For the new sequences, each bit was treated as a Bernoulli random variable with p=0.5. That is to say, each bit of a sequence has a 50% chance to be 1 and 50% chance to be −1. This process provides each sensor a distinct pattern, which can be a signature for signal classification, and at the same time, minimizes the human intervention during the sequence design. The sequence set generated and used in this example is shown in FIG. 14A. FIG. 14B shows the signature waveform of each sensor.

Figures 15A, 15B:
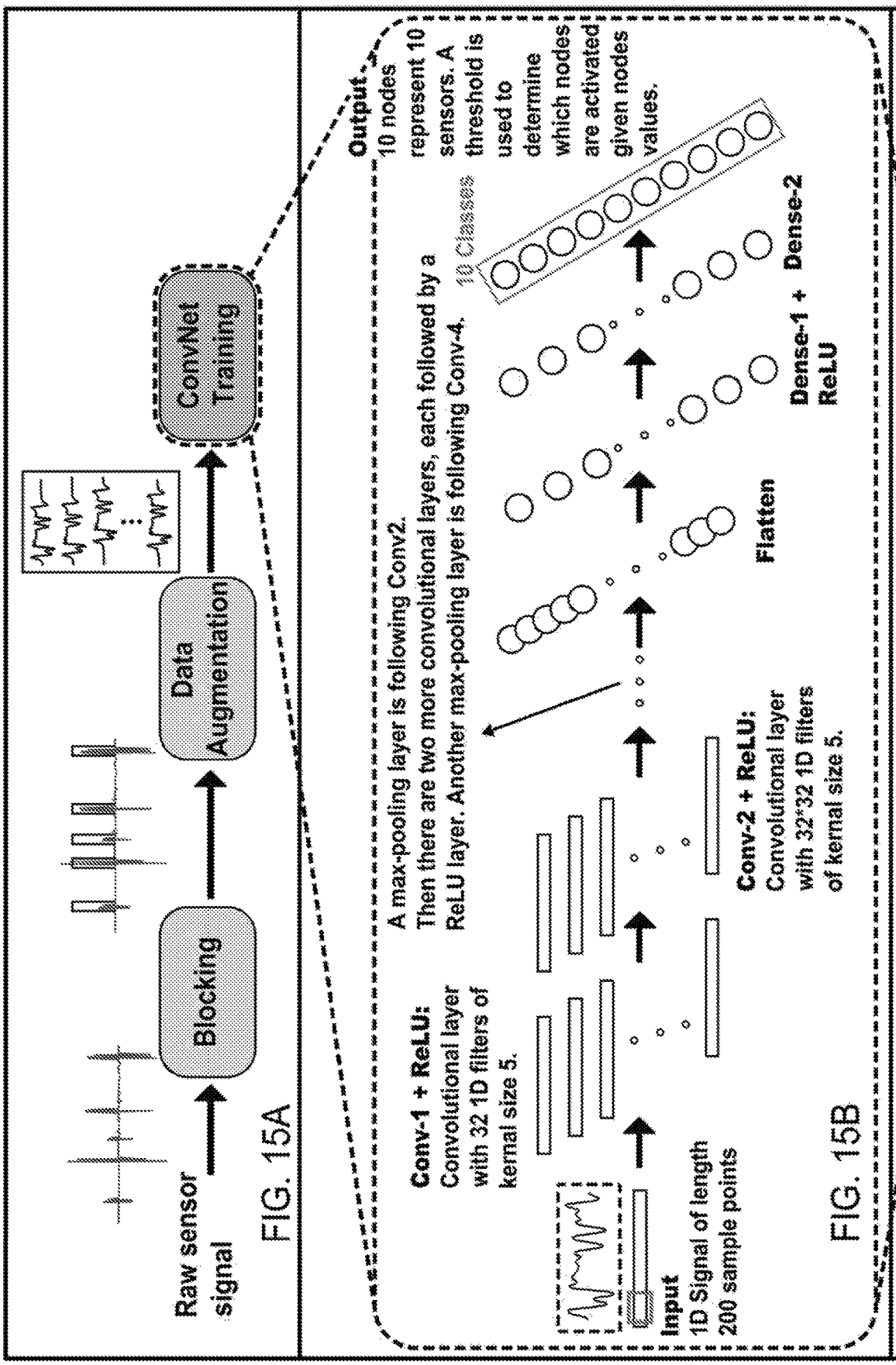
FIG. 15A illustrates the training process of the multi-label-training method.
FIG. 15B illustrates the ConvNet structure of the multi-label-training method.

A ConvNet that is made up of 4 convolutional layers was implemented (FIG. 15B). The first convolutional layer (Conv-1) had 32 1-dimensional convolutional kernels, each of which was connected to 5 neighboring sample points in the input signals, resulting in a total of 192 trainable parameters (including 32 bias parameters). The weighted sum of the output feature maps with added bias values from Conv-1 was non-linearly activated by a ReLU layer (Activation-1). The subsequent output was then processed by the Conv-2, which had 32 convolutional kernels of size 5 and a total of 5152 trainable parameters, and activated by the Activation-2. A pooling layer (Maxpooling-1) was used to down-sample the convoluted signal, and the output was further fed into the Conv-3, which contained 64 trainable kernels and 10304 trainable parameters, and then Conv-4, which contained 64 trainable kernels and 20544 trainable parameters. Each of Conv-3 and Conv-4 was followed by a ReLU layer (Activation-3 and Activation-4). Another pooling layer (Maxpooling-2) was placed right after the Activation-4. Following the Maxpooling-2 were two dense (fully-connected) layers, where the first one had 180224 trainable parameters and was activated by Activation-5, and the second had 640 trainable parameters and yielded the final output. The final output had 10 nodes, representing 10 microfluidic sensors (10 classes). Given an input signal, the ConvNet predicts the possibility with which the signal belongs to each Coulter sensor. The model has a total of 217056 trainable parameters. Table 3, which is provided in FIG. 16, shows the detail structure and parameters of the ConvNet.

FIG. 15A shows the flow diagram of the training process from raw sensor signals. A raw sensor signal was first blocked based on non-interfering and interfering cases. Then non-interfering cases were extracted and augmented to build a signal base, and from which the training signals were generated. The training signals were grouped into batches (batch gradient descent) with a batch size 500, which was fixed during the training process. The binary cross-entropy with logits loss function was used to calculate the loss between the real values and the predicted values. An Adam optimizer was used to minimize the calculated training error in each iteration. The learning rate was set to 0.001 for the first 10 epochs, 0.0001 for epoch 11 to 20, and 0.00001 for the epoch 21 to 30. The network is trained for 30 epochs, and before each epoch, the training signals were shuffled. Table 4, which is provided in FIG. 17, shows hyper-parameters used in training the ConvNet.

Figure 15C:
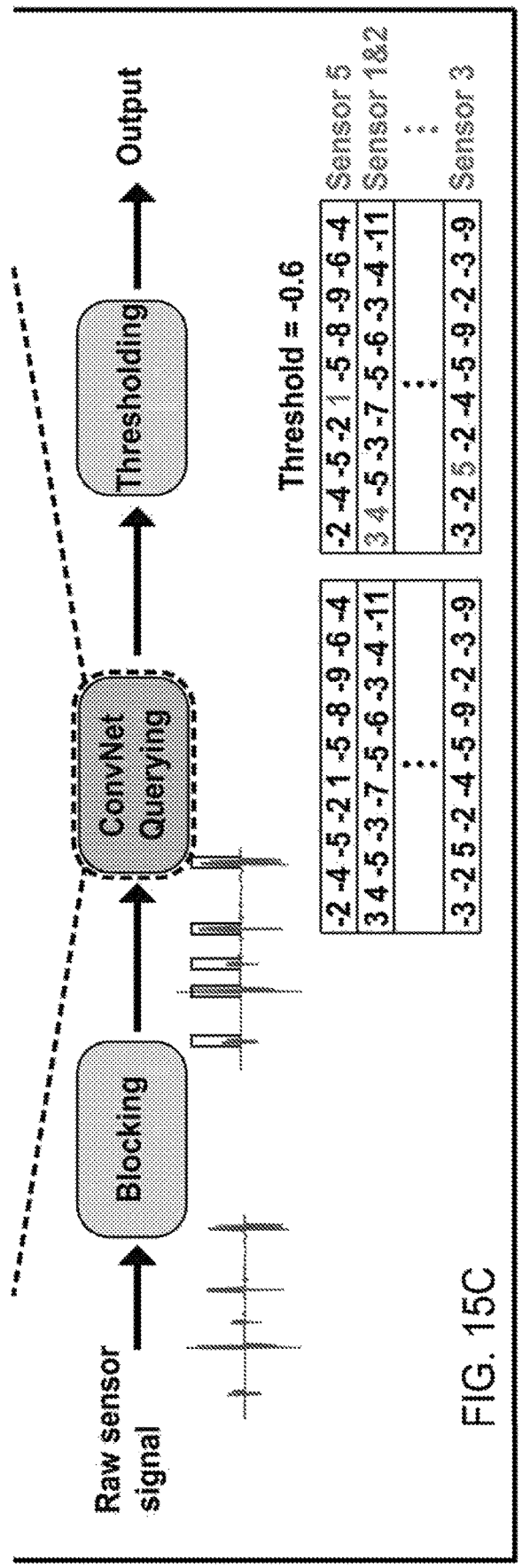
FIG. 15C illustrates the querying process of the multi-label-training method.

FIG. 15C shows the flow diagram of the querying process for raw sensor signals. The raw signal was first blocked. Each signal block was resampled to 200 sample points length, normalized to unit power, and then fed into the ConvNet. Given each input, the ConvNet generated ten outputs (for sensor 1 to sensor 10), the value of each was ranging from (−∞, +∞). These ten values were independent with each other, and the larger this value, the more probable that the input signal block contained a signal from the corresponding sensor. In this case, a threshold was set to determine whether a signal block contains a specific sensor signal. Like showing in the output table in FIG. 15C, each row is the ten outputs of one signal block, and if one value is larger than the threshold set (−0.6 in this case), it was determined that the corresponding sensor is activated in that signal block. Here, for the first row, sensor 5 is activated, and for the second row, sensor 1 and sensor 2 are both activated. The output of the network could further be converted into values between (0, 1) by a Sigmoid function, then the outputs are more interpretable and could be used as the probability with which a signal block contains a specific sensor signal.

Results Analysis

Figure 18A:
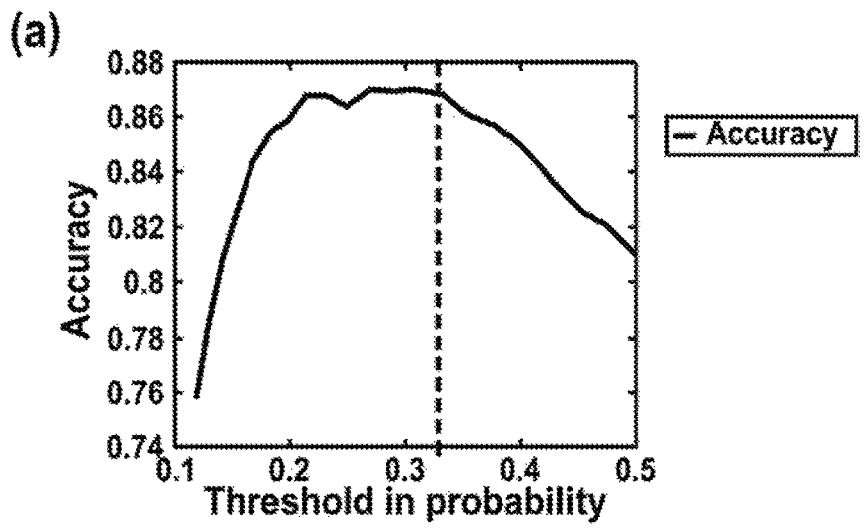
FIGS. 18A-18C illustrate the threshold (FIG. 18A), loss (FIG. 18B) and accuracy (FIG. 18C) of the multi-label training method.

The threshold is used to determine whether a signal block contains a specific sensor signal. To determine the optimum threshold, it was swept within a certain range (convert the threshold value into probability using the Sigmoid function), and observed the change of the querying accuracy. FIG. 18A shows the change of the querying accuracy as the sweeping of the threshold from 10% to 50%. The corresponding accuracy curve is parabolic and it was determined the optimum threshold is around 33% for this data set, which corresponds to −0.7 in the ConvNet output before implementing the Sigmoid function. That is to say, if the output of the ConvNet for a sensor is larger than −0.7 (33% in probability), that sensor is identified as an activated sensor in the corresponding signal block. The data set used for determining the threshold contained 500 signals, which were not used either in the training or querying process.

Figure 18B:
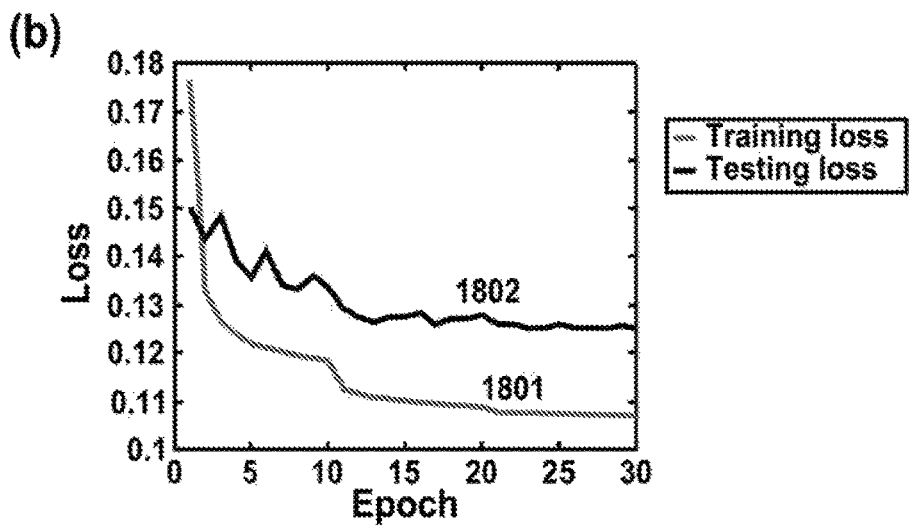
Figure 18C:
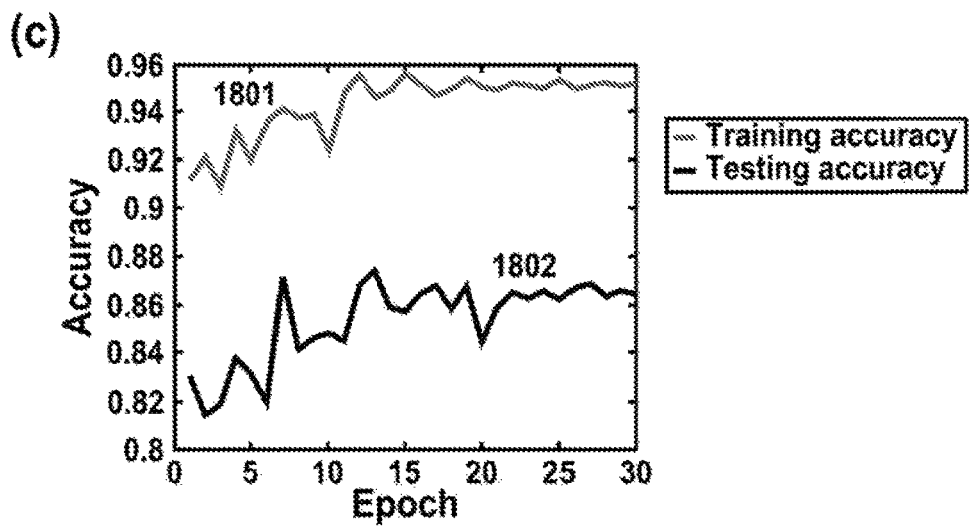
Figure 20A:
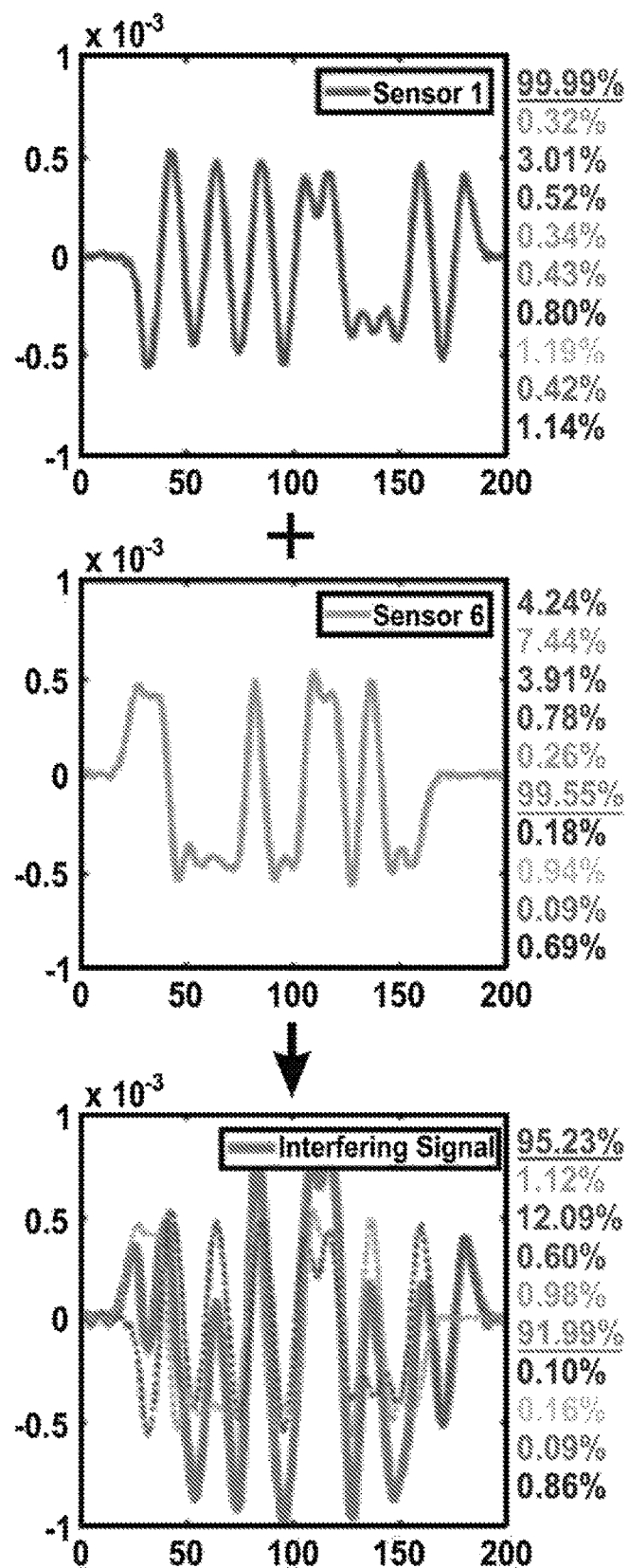
FIGS. 20A-20E illustrate the process of querying non-interfering and interfering signals using the multi-label training method.
Figure 20B:
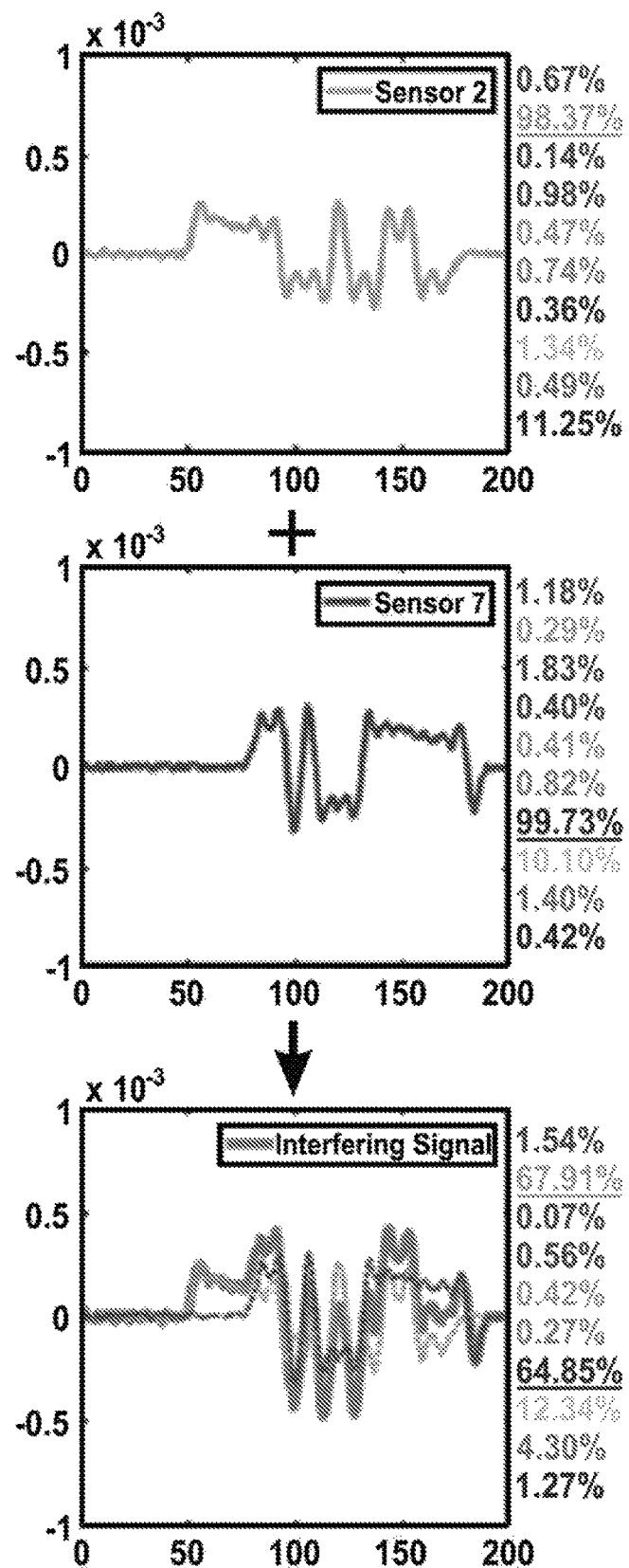
Figure 20C:
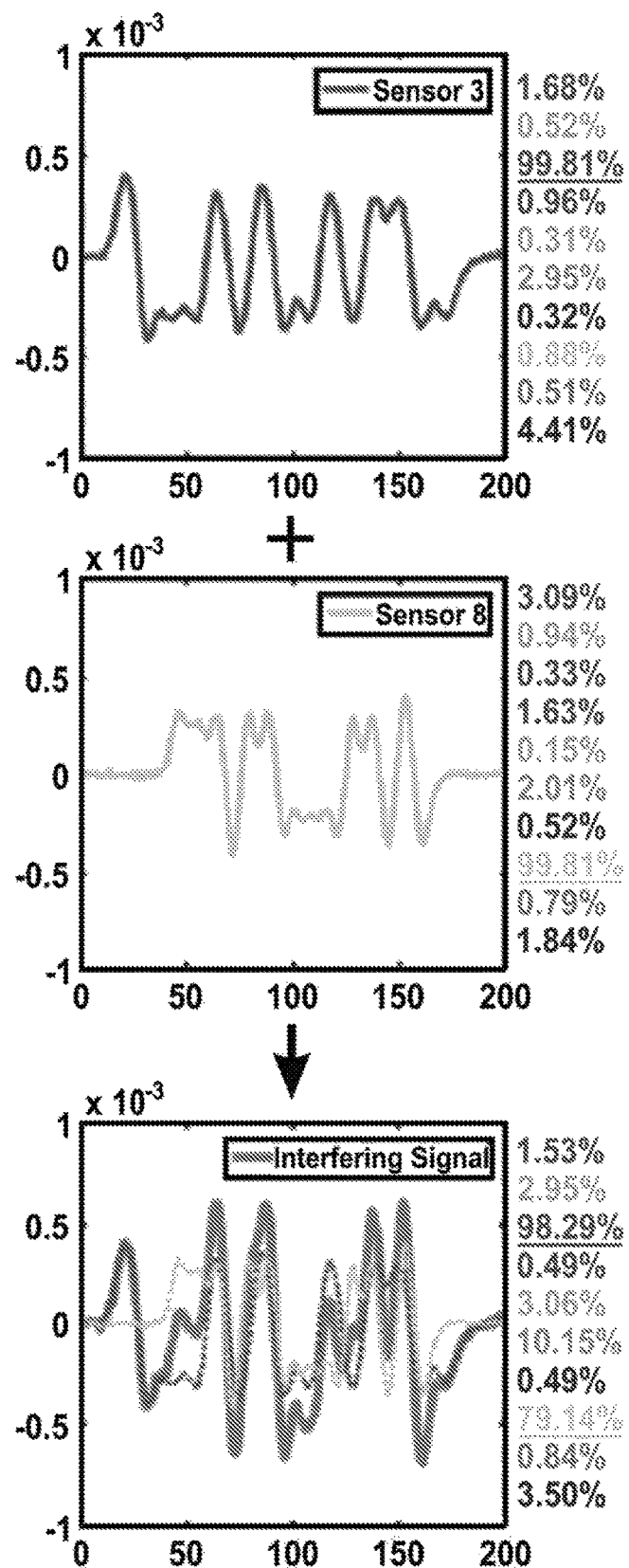
Figure 20D:
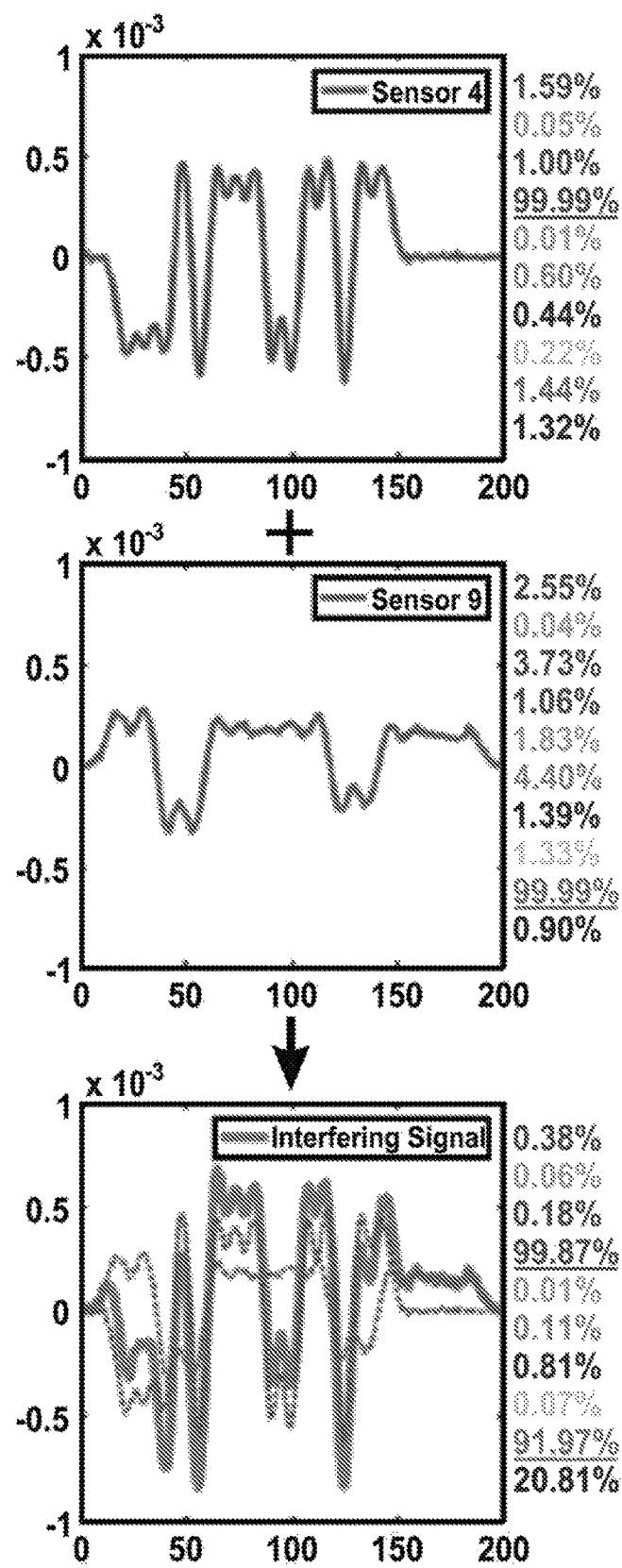
Figure 20E:
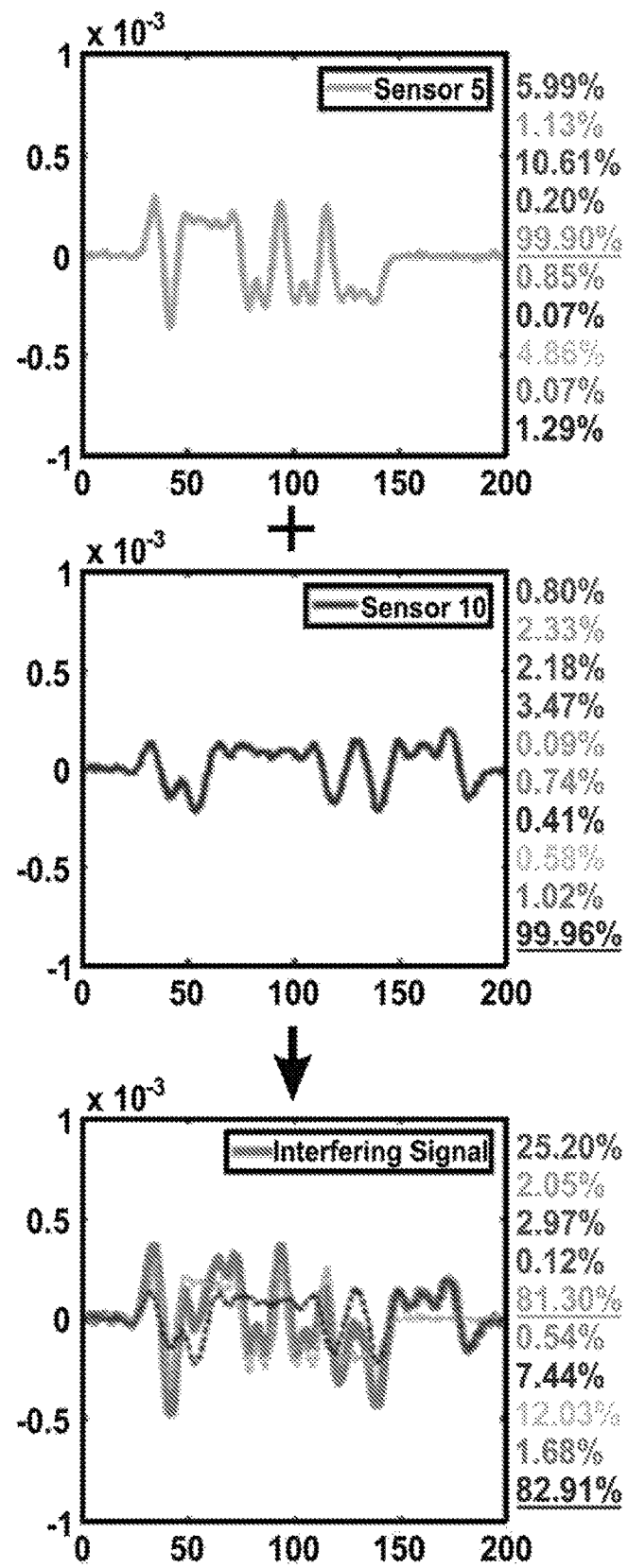

The performance of the ConvNet in terms of the loss and the accuracy with a maximum training epoch of 30 is shown in FIGS. 18B and 18C. The curve 1801 represents the performance regarding to the training data, and the curve 1802 represents the performance regarding to the testing data. In the first 10 epochs, the ConvNet learned to better represent the data, so performances on both training and testing data set improved. Starting from epoch 15, the performance on the training data kept improving slightly, while the performance on the testing data kept almost the same. To keep the network from overfitting, the training is stopped at epoch 30. The overall accuracies for training and testing data are 95% and 87%. Table 5, which is provided in FIG. 19, shows the classification result for each sensor in the testing data.

FIGS. 20A-20E present the querying results (in probability) for different sensor signals. Non-interfering signals for each of the ten sensors with varied amplitudes, durations, and time shifts are shown in the first and second row. For these non-interfering signals, the ConvNet output for the corresponding sensor is close to 100%, while outputs for other sensors are nearly 0%. In this case, it is possible to easily identify the activated sensor. The third row (bottom chart) of FIGS. 20A-20E shows the querying results for interfering signals. Each signal in the third row is a combination of the non-interfering signals (of the corresponding column) in the first and second row (top and middle charts). For these interfering signals, the corresponding output probabilities may not be close to 100% because of the interference between subcomponents, but it is still possible to identify the correct activated sensors by using the predetermined threshold (33%).

Multi-Stage Neural Network Method

Two neural networks, Regional Proposal Network (RPN) and Signal Classification Network (SCN) to solve Microfluidic CODES signals. Given a sensor output, RPN determines the bonding boxes (regions) that contain signature waveforms, which means it determines number of signals, with their amplitudes, positions, and durations. Identified signature waveforms are then extracted and fed into the SCN. SCN accounts for the classification of the corresponding region. These two networks share the same structure. The RPN and SCN are described above in detail above, for example, with regard to FIGS. 4A and 4B.

Figure 21B:
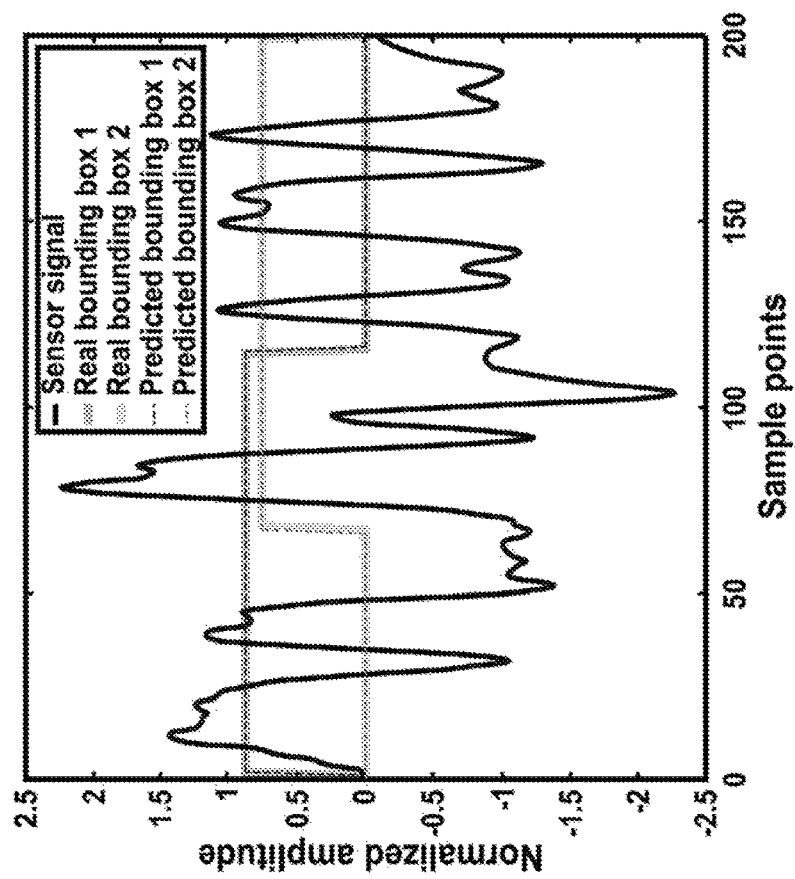
FIGS. 21A-21D illustrate the process of querying non-interfering and interfering signals using the multi-stage neural network method.
Figure 21A:
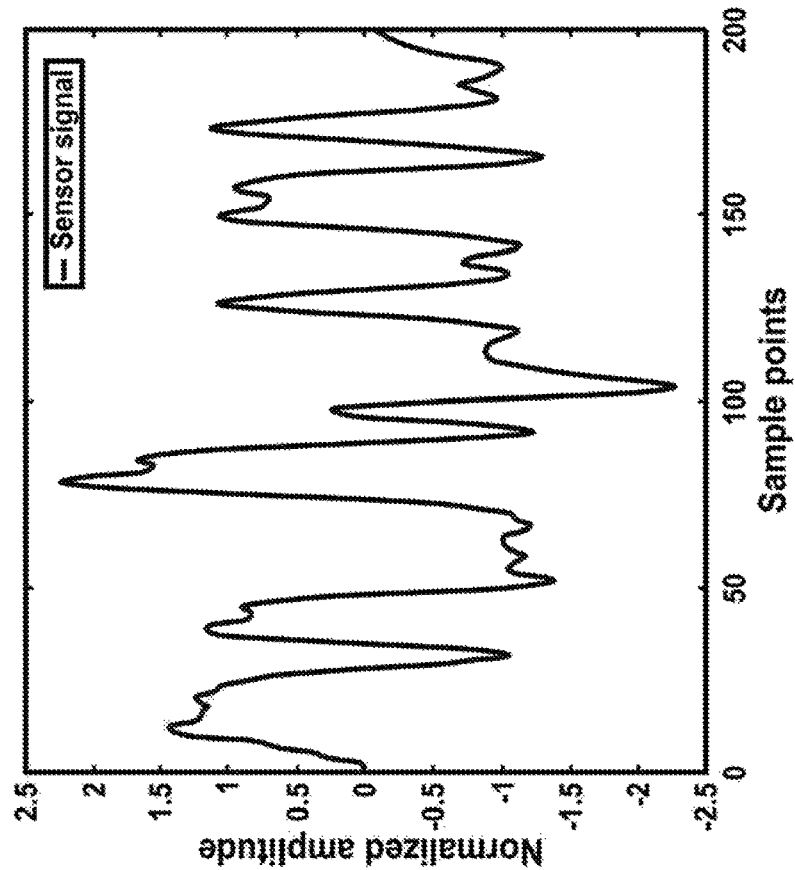
Figures 21C, 21D:
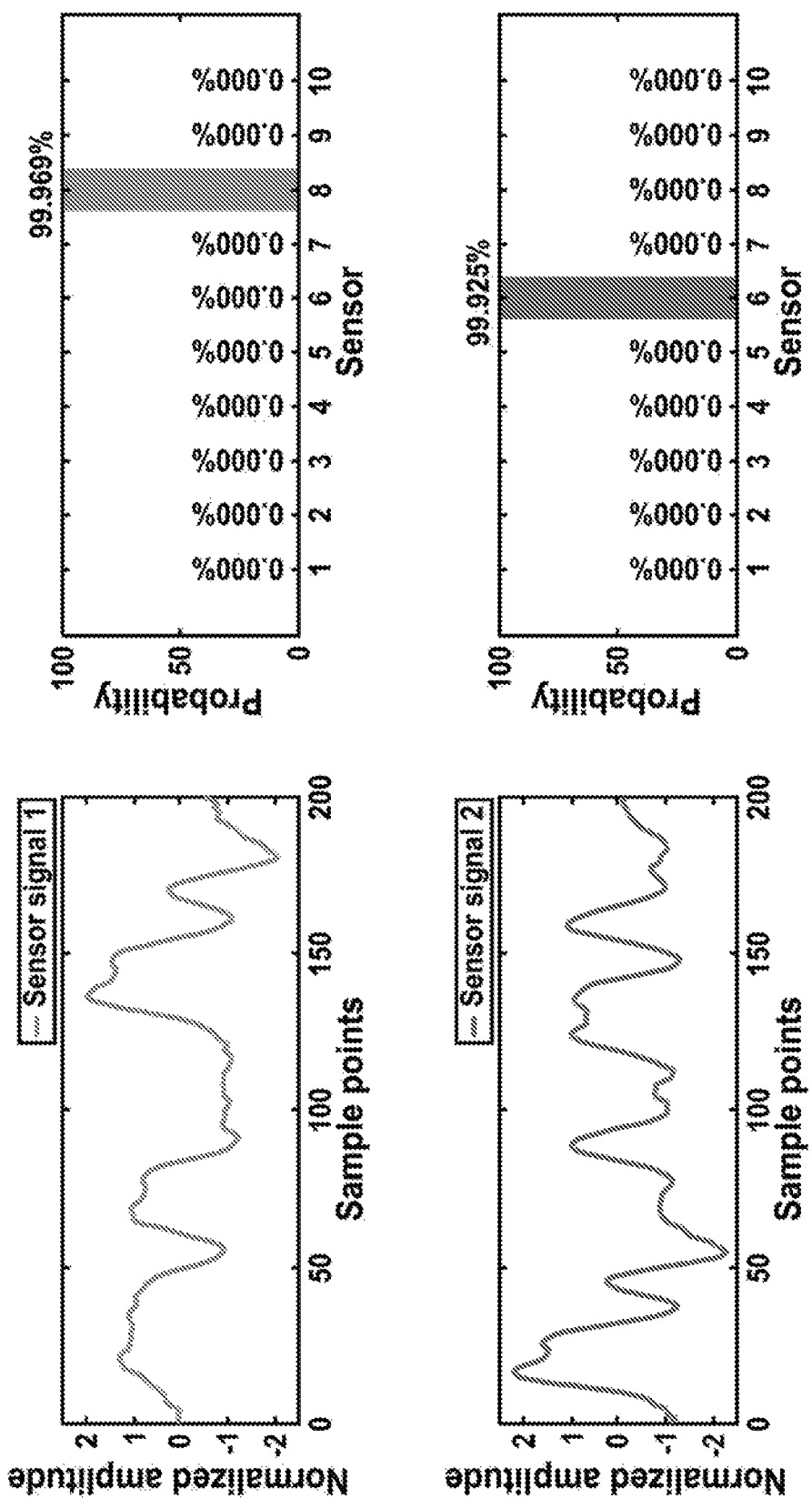

FIGS. 21A-21D demonstrate the querying process of the two-net method. FIG. 21A is an interfering sensor signal. After the RPN, two bounding boxes are identified in FIG. 21B. It can be seen that the predicted bounding boxes are highly overlapped with the real bounding boxes. Then in FIG. 21C, signal in each box is extracted and normalized, then fed into the SCN. In FIG. 21D, SCN gives the probability of the input signal with which it belongs to each sensor. Here the top signal waveform has a probability of 99% belonging to sensor 8, and the bottom signal waveform has a probability of 99% belonging to sensor 6.

REFERENCES

1 B. S. Bull, M. A. Schneiderman and G. Brecher, Am. J. Clin. Pathol., 1965, 44, 678-688.
2 G. T. Roberts and S. B. El Badawi, Am. J. Clin. Pathol., 1985, 83, 222-226.
3 E. Ginsburg and B. K. Vonderhaar, Cancer Res., 1995, 55, 2591-2595.
4 A. Saleem, M. Husheem, P. Härkönen and K. Pihlaja, J. Ethnopharmacol., 2002, 81, 327-336.
5 A. R. Duckworth, W. M. Brück, K. E. Janda, T. P. Pitts and P. J. McCarthy, Mar. Environ. Res., 2006, 2, 243-248.
6 H. E. Kubitschek, Nature, 1958, 182, 234-235.
7 B. Poutrel and C. Lerondelle, J. Dairy Sci., 1983, 66, 2575-2579.
8 J. Wang, Y. Sun, X. Y. Meng, L. F. Li, Y. Li, Y. Luo, W. Wang, S. Yu, C. Yin, S. Li and H. J. Qiu, Virus Res., 2018, 255, 68-76.
9 W. Bult, S. G. C. Kroeze, M. Elschot, P. R. Seevinck, F. J. Beekman, H. W. A. M. de Jong, D. R. A. Uges, J. G. K. Kosterink, P. R. Luijten, W. E. Hennink, A. D. van het Schip, J. L. H. Ruud Bosch, J. F. W. Nijsen and J. J. M. Jans, PLoS One, 2013, 8, e52178.
10 C. Nyström, J. Mazur, M. I. Barnett and M. Glazer, J. Pharm. Pharmacol., 1985, 37, 217-221.
11 S. M. Bezrukov, I. Vodyanoy and V. A. Parsegian, Nature, 1994, 370, 279-281.
12 S. Lambert and M. Wagner, Chemosphere, 2016, 161, 510-517.
13 M. M. Arimi, Environ. Technol. Rev., 2018, 7, 274-290.
14 D. C. Grulke, N. A. Marsh and B. A. Hills, Br. J. Exp. Pathol., 1973, 54, 684-691.
15 W. H. Coulter, Proc. Natl. Electron. Conf., 1956, 12, 1034-1040.
16 H. Bayley and C. R. Martin, Chem. Rev., 2000, 100, 2575-2594.
17 M. R. Kellman, F. R. Rivest, A. Pechacek, L. L. Sohn and M. Lustig, IEEE Sens. J., 2018, 18, 3068-3079.
18 A. Adamo, A. Sharei, L. Adamo, B. Lee, S. Mao and K. F. Jensen, Anal. Chem., 2012, 84, 6438-6443.
19 S. C. Bürgel, C. Escobedo, N. Haandbk and A. Hierlemann, Sens. Actuators, B, 2015, 210, 82-90.
20 A. De Ninno, V. Errico, F. R. Bertani, L. Businaro, P. Bisegna and F. Caselli, Lab Chip, 2017, 17, 1158-1166.
21 T. E. Winkler, H. Ben-Yoav and R. Ghodssi, Microfluid. Nanofluid., 2016, 20, 134.
22 H. Song, J. M. Rosano, Y. Wang, C. J. Garson, B. Prabhakarpandian, K. Pant, G. J. Klarmann, A. Perantoni, L. M. Alvarez and E. Lai, Anal. Methods, 2016, 8, 7437-7444.
23 J. Sun, J. Yang, Y. Gao, D. Xu and D. Li, Microfluid. Nanofluid., 2017, 21, 33.
24 O. A. Saleh and L. L. Sohn, Nano Lett., 2003, 3, 37-38.
25 T. Ito, L. Sun and R. M. Crooks, Anal. Chem., 2003, 75, 2399-2406.
26 D. Branton, D. W. Deamer, A. Marziali, H. Bayley, S. A. Benner, T. Butler, M. Di Ventra, S. Garaj, A. Hibbs, X. Huang, S. B. Jovanovich, P. S. Krstic, J. S. Lindsay, X. S. Ling, C. H. Mastrangelo, A. Meller, J. S. Oliver, Y. V. Pershin, J. M. Ramsey, R. Riehn, G. V. Soni, V. Tabard-Cossa, M. Wanunu, M. Wiggin and J. A. Schloss, Nat. Biotechnol., 2008, 26, 1146-1153.
27 W. Li, N. A. W. Bell, S. Hernández-Ainsa, V. V. Thacker, A. M. Thackray, R. Bujdoso and U. F. Keyser, ACS Nano, 2013, 7, 4129-4134.
28 F. Liu, L. Ni and J. Zhe, Biomicrofluidics, 2018, 12, 021501.
29 L. Zou, S. Li, Y. Kang, J. Liu, L. He, S. Sun, D. Gao, B. Qiu and W. Ding, Biomed. Microdevices, 2017, 19, 30.
30 O. Civelekoglu, N. Wang, M. Boya, T. Ozkaya-Ahmadov, R. Liu and A. F. Sarioglu, Lab Chip, 2019, 19, 2444-2455.
31 R. Liu, N. Wang, F. Kamili and A. F. Sarioglu, Lab Chip, 2016, 16, 1350-1357.
32 R. Liu, W. Waheed, N. Wang, O. Civelekoglu, M. Boya, C. H. Chu and A. F. Sarioglu, Lab Chip, 2017, 17, 2650-2666.
33 N. Wang, R. Liu, R. Khodambashi, N. Asmare and A. F. Sarioglu, Proceedings of IEEE 30th International Conference on Micro Electro Mechanical Systems (MEMS), Las Vegas, USA, Jan. 22-26, 2017, pp. 362-365.
34 C. W. Shields Iv, C. D. Reyes and G. P. López, Lab Chip, 2015, 15, 1230-1249.
35 R. Liu, C. H. Chu, N. Wang and A. F. Sarioglu, Proceedings of uTAS (The 22nd International Conference on Miniaturized Systems for Chemistry and Life Sciences), Kaohsiung, Taiwan, Nov. 11-15, 2018, pp. 1248-1250.
36 O. Civelekoglu, R. Liu, M. Boya, C. H. Chu, N. Wang and A. F. Sarioglu, Proceedings of 19th International Conference on Solid-State Sensors, Actuators and Microsystems (TRANSDUCERS), Kaohsiung, Taiwan, Jun. 18-22, 2017, pp. 480-483.
37 N. Asmare, A. K. M. Arifuzzman, M. Boya, N. Wang, R. Liu, C. H. Chu and A. F. Sarioglu, Proceedings of uTAS (The 22nd International Conference on Miniaturized Systems for Chemistry and Life Sciences), Kaohsiung, Taiwan, Nov. 11-15, 2018, pp. 1308-1310.
38 M. A. Abu-Rgheff, Introduction to CDMA Wireless Communications, Academic Press, Oxford, 2007.
39 R. Rao and S. Dianat, Basics of Code Division Multiple Access (CDMA), SPIE, Bellingham, W A, 2005.

40 R. Gold, IEEE Trans. Inf. Theory, 1967, 13, 619-621.
41 R. Gold, IEEE Trans. Inf. Theory, 1968, 14, 154-156.
42 R. Liu, N. Wang, N. Asmare and A. F. Sarioglu, Biosens. Bioelectron., 2018, 120, 30-39.
43 W. Liu, D. Anguelov, D. Erhan, C. Szegedy, S. Reed, C. Y. Fu and A. C. Berg, European Conference on Computer Vision, 2016, pp. 21-37.
44 M. Chen, Y. Hao, K. Hwang, L. Wang and L. Wang, IEEE Access, 2017, 5, 8869-8879.
45 Y. LeCun, Y. Bengio and G. Hinton, Nature, 2015, 521, 436-444.
46 A. Ignatov, Appl. Soft Comput., 2018, 62, 915-922.
47 S. Kiranyaz, T. Ince and M. Gabbouj, IEEE Trans. Biomed. Eng., 2015, 63, 664-675.
48 Y. Zhang, W. Chan and N. Jaitly, IEEE International Conference on Acoustics, Speech and Signal Processing (ICASSP), 2017, pp. 4845-4849.
49 A. Krizhevsky, I. Sutskever and G. E. Hinton, Commun. ACM, 2017, 60, 84-90.
50 N. Wang, R. Liu and A. F. Sarioglu, J. Visualized Exp., 2017, 121, e55311.
50 P. Murugan, 2018, arXiv: 1801.01397.
52 D. R. Jones, M. Schonlau and W. J. Welch, J. Glob. Optim., 1998, 13, 455-492.
53 D. A. van Dyk and X. L. Meng, J. Comput. Graph. Stat., 2001, 10, 1-50.
54 I. Goodfellow, Y. Bengio and A. Courville, Deep Learning, MIT Press, Cambridge, Mass., USA, 2016.
55 R. W. DeBlois and C. P. Bean, Rev. Sci. Instrum., 1970, 41, 909-916.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for decoding code-multiplexed Coulter signals, comprising:
   receiving a code-multiplexed signal detected by a network of Coulter sensors, the code-multiplexed signal comprising a plurality of distinct Coulter signals;
   inputting the code-multiplexed signal into a deep-learning network;
   determining information indicative of at least one of a size, a speed, or a location of a particle detected by the network of Coulter sensors by using the deep-learning network to process the code-multiplexed signal; and
   storing the information indicative of at least one of the size, the speed, or the location of the particle detected by the network of Coulter sensors.

2. The computer-implemented method of claim 1, wherein the code-multiplexed signal is a one-dimensional signal.

3. The computer-implemented method of claim 1, wherein the distinct Coulter signals include two or more non-orthogonal signals.

4. The computer-implemented method of claim 1, wherein the distinct Coulter signals include two or more mutually orthogonal signals.

5. The computer-implemented method of claim 1, wherein the code-multiplexed signal includes interfering Coulter signals.

6. The computer-implemented method of claim 1, wherein the deep-learning network is a convolutional neural network.

7. The computer-implemented method of claim 6, wherein the convolutional neural network is a multi-stage convolutional neural network.

8. The computer-implemented method of claim 7, wherein the step of determining information indicative of at least one of a size, a speed, or a location of a particle detected by the network of Coulter sensors by using the deep-learning network to process the code-multiplexed signal comprises:
   identifying, using a first convolutional neural network, a signature waveform in the code-multiplexed signal;
   predicting, using the first convolutional neural network, the size of the particle or the speed of the particle based, at least in part, on an amplitude of the signature waveform or a duration of the signature waveform, respectively; and
   predicting, using a second convolutional neural network, the location of the particle based, at least in part, on the signature waveform.

9. The computer-implemented method of claim 8, wherein the step of predicting, using a second convolutional neural network, the location of the particle based, at least in part, on the signature waveform comprises predicting which particular Coulter sensor in the network of Coulter sensors detected the signature waveform.

10. The computer-implemented method of claim 8, wherein the step of predicting, using a second convolutional neural network, the location of the particle based, at least in part, on the signature waveform comprises predicting a respective probability that each Coulter sensor in the network of Coulter sensors detected the signature waveform.

11. The computer-implemented method of claim 1, further comprising providing display data comprising the information indicative of at least one of the size, the speed, or the location of the particle detected by the network of Coulter sensors.

12. A sensing platform for use with a network Coulter sensors, comprising:
   a processor and a memory operably coupled to the processor, the memory having computer-executable instructions stored thereon that, when executed by the processor, cause the processor to receive a code-multiplexed signal comprising a plurality of distinct Coulter signals; and
   a deep-learning network configured to:
      input the code-multiplexed signal received by the processor, and
      determine information indicative of at least one of a size, a speed, or a location of a particle detected by the network of Coulter sensors by using the deep-learning network to process the code-multiplexed signal, wherein the memory has further computer-executable instructions stored thereon that, when executed by the processor, cause the processor to store the information indicative of at least one of the size, the speed, or the location of the particle detected by the network of Coulter sensors.

13. The sensing platform of claim 12, wherein the deep-learning network is a convolutional neural network.

14. The sensing platform of claim 13, wherein the convolutional neural network is a multi-stage convolutional neural network.

15. The sensing platform of claim 14, wherein the multi-stage convolutional neural network comprises:
   a first convolutional neural network configured to:
      identify a signature waveform in the code-multiplexed signal, and predict the size of the particle or the speed of the particle based, at least in part, on an amplitude of the signature waveform or a duration of the signature waveform, respectively; and a second convolutional neural network configured to predict the location of the particle based, at least in part, on the signature waveform.

16. The sensing platform of claim 15, wherein the second convolutional neural network is configured to predict which particular Coulter sensor in the network of Coulter sensors detected the signature waveform.

17. The sensing platform of claim 16, wherein the second convolutional neural network is configured to predict a respective probability that each Coulter sensor in the network of Coulter sensors detected the signature waveform.

18. A system, comprising:
a microfluidic device comprising the network of Coulter sensors, wherein the microfluidic device is configured to detect the code-multiplexed signal; and
the sensing platform of claim 12, wherein the sensing platform is operably coupled to the microfluidic device.

19. The system of claim 18, wherein each of the Coulter sensors comprises a plurality of electrodes arranged in proximity to a respective aperture of the microfluidic device.

20. The system of claim 18, wherein each of the Coulter sensors has a unique electrode pattern.

21. The system of claim 20, wherein each of the Coulter sensors is configured to produce a respective distinct Coulter signal.

22. The system of claim 21, wherein the distinct Coulter signals include two or more non-orthogonal signals.

23. The system of claim 21, wherein the distinct Coulter signals include two or more mutually orthogonal signals.

24. The system of claim 18, wherein each of the Coulter sensors is encoded.

25. The system of claim 24, wherein each of the Coulter sensors is encoded by a respective digital code.

26. The system of claim 25, wherein the respective digital codes are randomly generated.

* * * * *